(12) United States Patent  
Shen et al.

(10) Patent No.: US 11,194,452 B1  
(45) Date of Patent: Dec. 7, 2021

(54) METHODS, DEVICES, AND SYSTEMS FOR PROVIDING INTERFACES AND AUDIO/VIDEO DATA FOR A VIRTUAL EVENT

(71) Applicant: Gather Wholesale, Inc., Walnut, CA (US)

(72) Inventors: Jerry Shen, Walnut, CA (US); Roberto Ortiz, Arvada, CO (US); Tiger Shen, Walnut, CA (US)

(73) Assignee: GATHER WHOLESALE, INC., Walnut, CA (US)

( * ) Notice: Subject to any disclaimer, the term of this patent is extended or adjusted under 35 U.S.C. 154(b) by 0 days.

(21) Appl. No.: 17/031,309

(22) Filed: Sep. 24, 2020

(51) Int. Cl.
*G06F 3/0484* (2013.01)
*G06F 3/0482* (2013.01)
*H04N 7/15* (2006.01)

(52) U.S. Cl.
CPC .......... *G06F 3/0484* (2013.01); *G06F 3/0482* (2013.01); *H04N 7/15* (2013.01)

(58) Field of Classification Search
CPC ........ H04N 7/15; H04N 7/157; H04L 65/403; H04L 5/4038; H04L 12/1822; H04L 65/4046; G06Q 10/1095; G06F 3/04817; G06F 3/0484; G06F 3/0482
See application file for complete search history.

(56) References Cited

U.S. PATENT DOCUMENTS

| | | | |
|---|---|---|---|
| 9,961,119 B2* | 5/2018 | Bader-Natal | H04N 7/15 |
| 2015/0334142 A1* | 11/2015 | Gottlieb | H04L 65/403 |
| | | | 715/753 |
| 2016/0088259 A1* | 3/2016 | Anderson | H04L 65/1083 |
| | | | 348/14.03 |
| 2019/0007467 A1* | 1/2019 | Powell | H04L 12/1822 |

OTHER PUBLICATIONS nerdschalk.com website, "How to take a photo of Google Duo call," published Jul. 7, 2020, downloaded at https://nerdschalk.com/how-to-take-a-side-by-side-photo-on-google-duo-video-call/ (Year: 2020).*

(Continued)

*Primary Examiner* — Eric J Yoon
(74) *Attorney, Agent, or Firm* — NK Patent Law

(57) ABSTRACT

Methods, devices, and systems are disclosed for providing an interactive virtual event to a plurality of participants. According to one embodiment, a computer implemented method includes providing a first participant graphical user interface (GUI) to a first participant client device of the interactive virtual event, providing a second participant GUI to a second participant client device of the interactive virtual event, providing a first production control GUI to a first event coordinator, receiving first participant audio/video (A/V) data from the first participant client device in near real-time, receiving second participant A/V data from the second participant client device in near real-time, providing the first participant A/V data to the first production control GUI, transmitting the first participant A/V data to a plurality of participant client devices associated with the plurality of participants, and providing the second participant A/V data to the first production control GUI.

18 Claims, 28 Drawing Sheets

(56) References Cited

OTHER PUBLICATIONS

YouTube video, "How to Accept Donations on Your Facebook or YouTube LIVE Stream," published Dec. 3, 2018, downloaded at https://www.youtube.com/watch?v=UdFrX-Q-yBg&t=235s (Year: 2018).*

Causevox website, "Donation Page vs Paypal Donate Button: Which One Should You Choose?", published Sep. 23, 2020, downloaded from https://www.causevox.com/blog/donation-page-vs-paypal-button/ (Year: 2020).*

YouTube video, "Eyeson Recording and Snapshots Tutorial," published on Jun. 9, 2020, downloaded at https://www.youtube.com/watch?v=1jU3qkBBrGw&t=17s (Year: 2020).*

\* cited by examiner

METHODS, DEVICES, AND SYSTEMS FOR PROVIDING INTERFACES AND AUDIO/VIDEO DATA FOR A VIRTUAL EVENT

TECHNICAL FIELD

The present invention relates to a server application, a mobile device application, and a client/server infrastructure; and more specifically to methods, devices, and systems for providing and managing a virtual event.

BACKGROUND

Virtual event popularity continues to expand replacing and/or supplementing traditional in-person events. Virtual events provide better accessibility to attendees while reducing overall expenses associated with in-person events. Additionally, virtual events may be the only option during pandemics and the like where any in-person contact is discouraged. Types of virtual events include virtual conferences, webinars, and intra-company meetings. These virtual events may include training sessions, sales meetings, worship services, weddings, funerals, or the like.

However virtual events can suffer from unprepared speakers, poor audio/visual (A/V) quality, and/or outright bloopers. Basically, many things can go wrong in a virtual event. These mishaps may reflect directly on the company and/or brand providing and/or sponsoring the virtual event.

Accordingly, a need exists to better facilitate and manage virtual events to better replicate in-person events.

SUMMARY

The presently disclosed subject matter is directed toward methods, devices, and systems for better facilitation of virtual events.

According to one embodiment, a computer implemented method is disclosed for providing an interactive virtual event to a plurality of participants. The computer-implemented method includes (1) providing a first participant graphical user interface (GUI) to a first participant client device of the interactive virtual event, (2) providing a second participant GUI to a second participant client device of the interactive virtual event, (3) providing a first production control GUI to a first event coordinator, (4) receiving first participant audio/video (A/V) data from the first participant client device in near real-time, (5) receiving second participant A/V data from the second participant client device in near real-time, (6) providing the first participant A/V data to the first production control GUI, (7) transmitting the first participant A/V data to a plurality of participant client devices associated with the plurality of participants, and (8) providing the second participant A/V data to the first production control GUI.

In some embodiments, the computer-implemented method may further include transmitting at least a portion of the first participant A/V data to a first plurality of participant client devices. The first production control GUI may also be configured to (1) facilitate the first event coordinator in providing two-way communication between the first event coordinator and a second participant using the second participant client device, (2) prequalifying the second participant A/V data including determining a video quality level and an audio quality level of the second participant A/V data, (3) initiating transmission of the second participant A/V data to the first plurality of participant client devices, and (4) terminating transmission of the first participant A/V data to the first plurality of participant client devices.

In some embodiments, the first production control GUI may be further configured to facilitate the first event coordinator in (1) selecting first supplemental content associated with the first participant A/V data to be provided to the first plurality of participant client devices simultaneously with the first participant A/V data, and (2) selecting second supplemental content associated with the second participant A/V data to be provided to the first plurality of participant client devices simultaneously with the second participant A/V data.

In some embodiments, the first supplemental content may be at least one of an overlay, a slideshow, a prerecorded video, or the like. The second supplemental content may also be at least one of an overlay, a slideshow, a prerecorded video, or the like.

In some embodiments, the first supplemental content may be selected from a first supplemental content list associated with the first participant A/V data and the first supplemental content list may be displayed on the first production control GUI. The second supplemental content may be selected from a second supplemental content list associated with the second participant A/V data and the second supplemental content list may be displayed on the first production control GUI.

In some embodiments, the computer-implemented method may further include providing a second production control GUI. The second production control GUI may be configured to facilitate a second event coordinator in (1) providing two-way communication between the second event coordinator and the second participant using the second participant client device, (2) prequalifying the second participant A/V data including determining the video quality level and the audio quality level of the second participant A/V data, (3) initiating transmission of the second participant A/V data to the first plurality of participant client devices, (4) terminating transmission of the first participant A/V data to the first plurality of participant client devices, (5) selecting the first supplemental content associated with the first participant A/V data to be provided to the first plurality of participant client devices simultaneously with the first participant A/V data, and (6) selecting the second supplemental content associated with the second participant A/V data to be provided to the first plurality of participant client devices simultaneously with the first participant A/V data.

In some embodiments, the interactive virtual event may be at least one of a corporate event, a private event, a charity event, or the like. The interactive virtual event may also be at least one of a corporate conference, an industry trade show, a seminar, a new product launch, or the like.

In some embodiments, the computer-implemented method may further include providing a participant GUI to each participant client device of the plurality of participant client devices. The participant GUI may be configured to provide a main virtual event selection and at least one of a virtual lounge selection, a virtual photo booth selection, a donation webpage selection, or the like.

In some embodiments, the main virtual event selection may configure the participant GUI to display a primary A/V stream for the interactive virtual event.

In some embodiments, the donation webpage selection may configure the participant GUI to display a primary window having a plurality of donation selections for making a contribution related to the interactive virtual event and a secondary window displaying the primary A/V stream. The donation webpage selection may also configure the participant GUI to display an additional secondary window for chat. In certain embodiments, the plurality of donation selections may include at least two of a one-time donation; a recurring donation; a preselection amount, or the like In some embodiments, the virtual photo booth selection may configure the participant GUI for inviting one or more participants of the plurality of participants to capture a group photo. The virtual photo booth selection may further configure the participant GUI for selecting a group background for the group photo from a plurality of backgrounds.

In some embodiments, the virtual lounge selection may configure the participant GUI for selecting a plurality of virtual lounge options including a plurality of virtual meeting rooms. In certain embodiments, each room of the plurality of virtual meetings rooms may be specific to a unique topic and each unique topic may be related to a theme of the interactive virtual event. In certain embodiments, the virtual lounge selection may further configure the participant GUI for A/V communication with one or more participants of the plurality of participants having previously selected the virtual lounge option.

In some embodiments, the first participant GUI may be provided by an application specific program executing instructions on the first participant client device. In other embodiments the first participant GUI may be provided by a web browser. The web browser may be a Microsoft Internet Explorer® browser, a Microsoft Edge® browser, an Apple Safari® browser, a Google Chrome® browser, a Mozilla Firefox® browser, an Opera® browser, or the like. The first participant mobile device may a fixed device or a mobile device. The fixed device may be a personal computer (PC), a workstation, a smart TV, or the like. The mobile device may be a smart phone, a tablet, a laptop, a smart watch, or the like. The first application specific program may be an iOS® app, an Android® OS app, or the like. In certain embodiments, at least a portion of first participant GUI may include a 3-dimensional (3D) hologram projector. Is still other embodiments, at least a portion of first participant GUI may include a virtual reality (VR) user interface (e.g. a VR headset).

In another embodiment, a server is disclosed for providing an interactive virtual event to a plurality of participants. The server includes a memory and at least one processor configured to perform a method. The method includes (1) providing a first participant GUI to a first participant client device of the interactive virtual event, (2) providing a second participant GUI to a second participant client device of the interactive virtual event, (3) providing a first production control GUI to a first event coordinator, (4) receiving first participant A/V data from the first participant client device in near real-time, (5) receiving second participant A/V data from the second participant client device in near real-time, (6) providing the first participant A/V data to the first production control GUI, (7) transmitting the first participant A/V data to a plurality of participant client devices associated with the plurality of participants, and (8) providing the second participant A/V data to the first production control GUI.

In some embodiments, the server may be a portion of a networked computing environment. The networked computing environment may be a cloud computing environment. In certain embodiments, the networked computing environment may be a portion of the Amazon Web Services (AWS®) cloud computing environment, the Microsoft Azure® cloud computing environment, Google® Cloud Platform computing environment, or the like. In certain embodiments, the server may be a virtualized server.

In another embodiment, a non-transitory computer readable medium includes a plurality of machine-readable instructions which when executed by one or more processors of a server are adapted to cause the server to perform a method of providing an interactive virtual event to a plurality of participants. The method includes (1) providing a first participant GUI to a first participant client device of the interactive virtual event, (2) providing a second participant GUI to a second participant client device of the interactive virtual event, (3) providing a first production control GUI to a first event coordinator, (4) receiving first participant A/V data from the first participant client device in near real-time, (5) receiving second participant A/V data from the second participant client device in near real-time, (6) providing the first participant A/V data to the first production control GUI, (7) transmitting the first participant A/V data to a plurality of participant client devices associated with the plurality of participants, and (8) providing the second participant A/V data to the first production control GUI.

BRIEF DESCRIPTION OF THE DRAWINGS

The present embodiments are illustrated by way of example and are not intended to be limited by the figures of the accompanying drawings. In the drawings:

FIG. 8 depicts a diagram illustrating another production control GUI provided to event coordinator of FIG. 7 in accordance with embodiments of the present disclosure.

FIG. 18 depicts a diagram illustrating another participant GUI for participation in the interactive virtual event of FIG. 7 through FIG. 15 in accordance with embodiments of the present disclosure.

FIG. 20 depicts a diagram illustrating another participant GUI for participation in the interactive virtual event of FIG. 7 through FIG. 15 for in accordance with embodiments of the present disclosure.

FIG. 21 depicts a diagram illustrating another participant GUI for participation in the interactive virtual event of FIG. 7 through FIG. 15 for in accordance with embodiments of the present disclosure.

DETAILED DESCRIPTION

Figure 1:
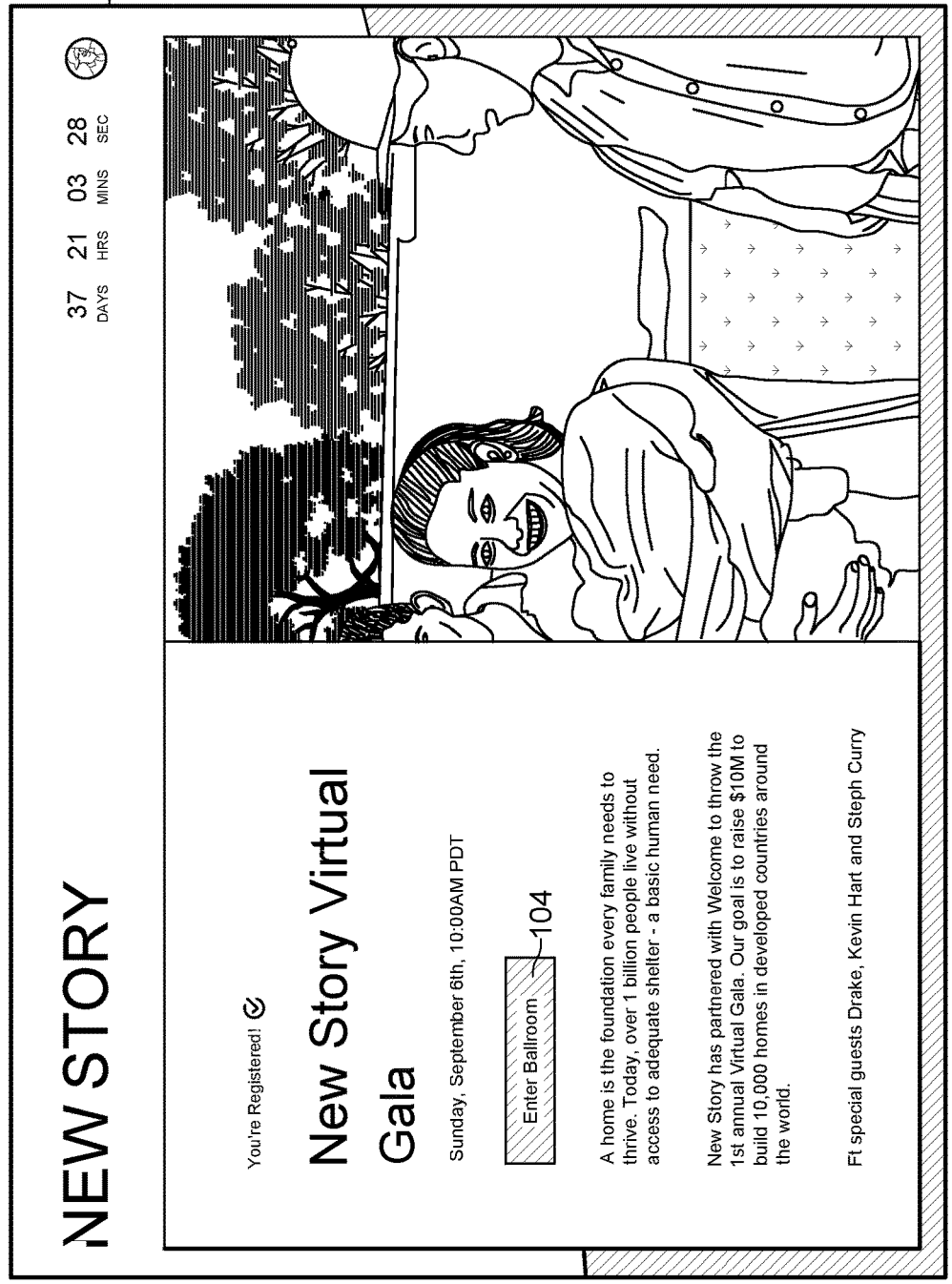
FIG. 1 depicts a diagram illustrating a participant graphical user interface (GUI) of a registration screen provided to a participant for an interactive virtual event in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, devices, and systems for providing better facilitation and management of virtual events to better replicate in-person events. Specifically the Welcome® system is disclosed that solves many of the issues with virtual events previously discussed in addition to better replicating the in-person experience.

In one embodiment, the Welcome® system (FIG. 1 through FIG. 6) is disclosed as providing a virtual gala (e.g. a social occasion with special entertainments and/or performances). FIG. 1 depicts a diagram 100 illustrating a graphical user interface (GUI) 102 of a registration page associated with the virtual gala. As depicted, an attendee has finished registration and can now enter the ballroom by clicking the labeled button 104 (i.e. a graphical control element that allows the user to trigger an event).

Figure 2:
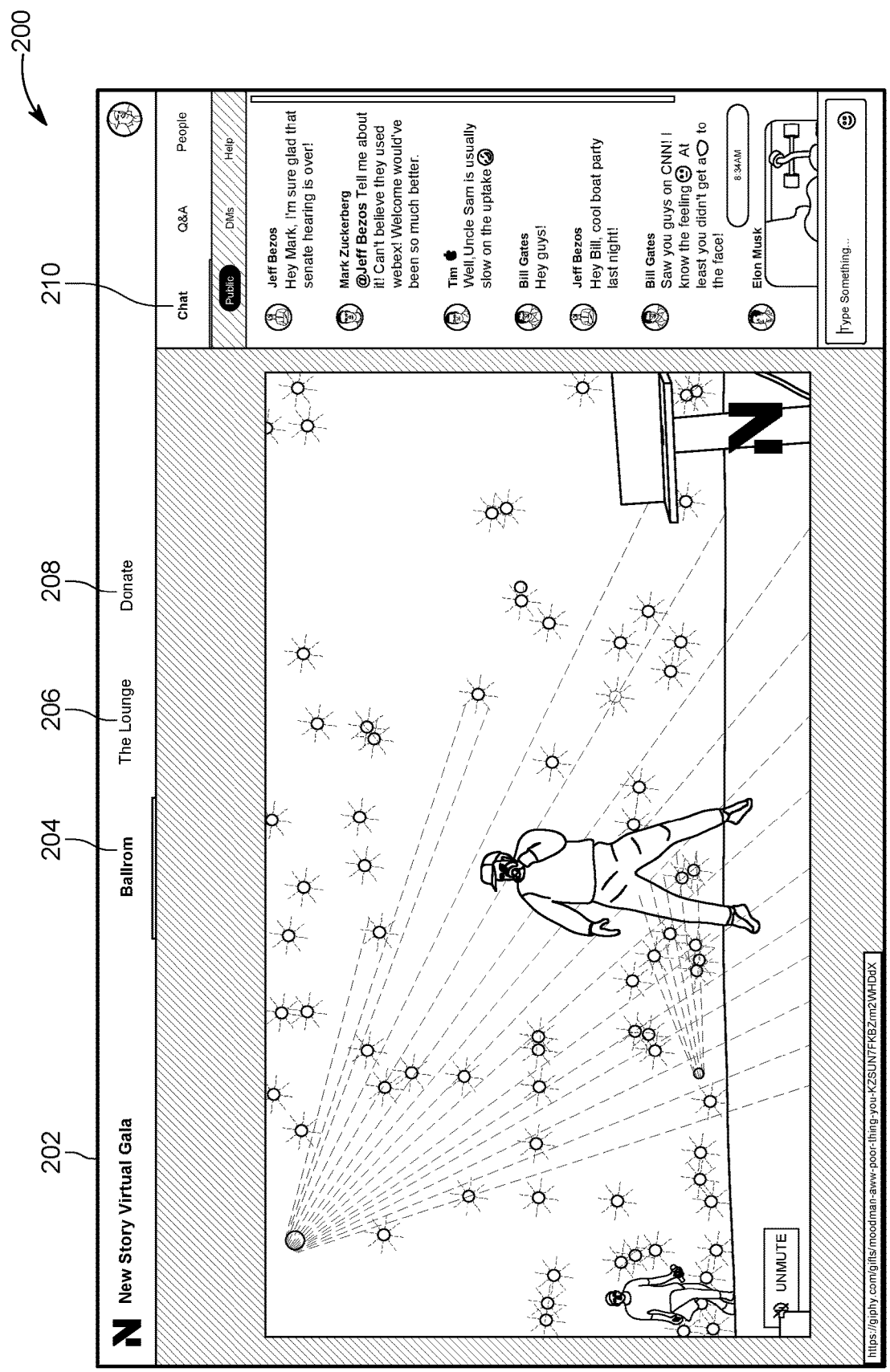
FIG. 2 depicts a diagram illustrating a participant screen GUI provided to the participant of FIG. 1 during the interactive virtual event depicting a performer on a stage in accordance with embodiments of the present disclosure.

FIG. 2 depicts a diagram 200 illustrating a participant screen GUI 202 provided to the participant of FIG. 1 during the interactive virtual event depicting a performer on a stage (i.e. a live video) in accordance with embodiments of the present disclosure. The participant screen GUI 202 provides for participant selections for a ballroom selection 204 (currently selected and displayed), a lounge selection 206, and a donate selection 208. A chat window 210 is currently selected on the right side of the participant screen GUI 202. Additional selections are available for questions and answers, and to display other people in attendance via the Welcome® system. As shown an "A" list celebrity is performing in the ballroom section 201. Tech luminaires virtual conversations are being displayed in the chat window (i.e. Jeff Bezos, Mark Zuckerberg, Tim Cook, Bill Gates, etc.)

Figure 3:
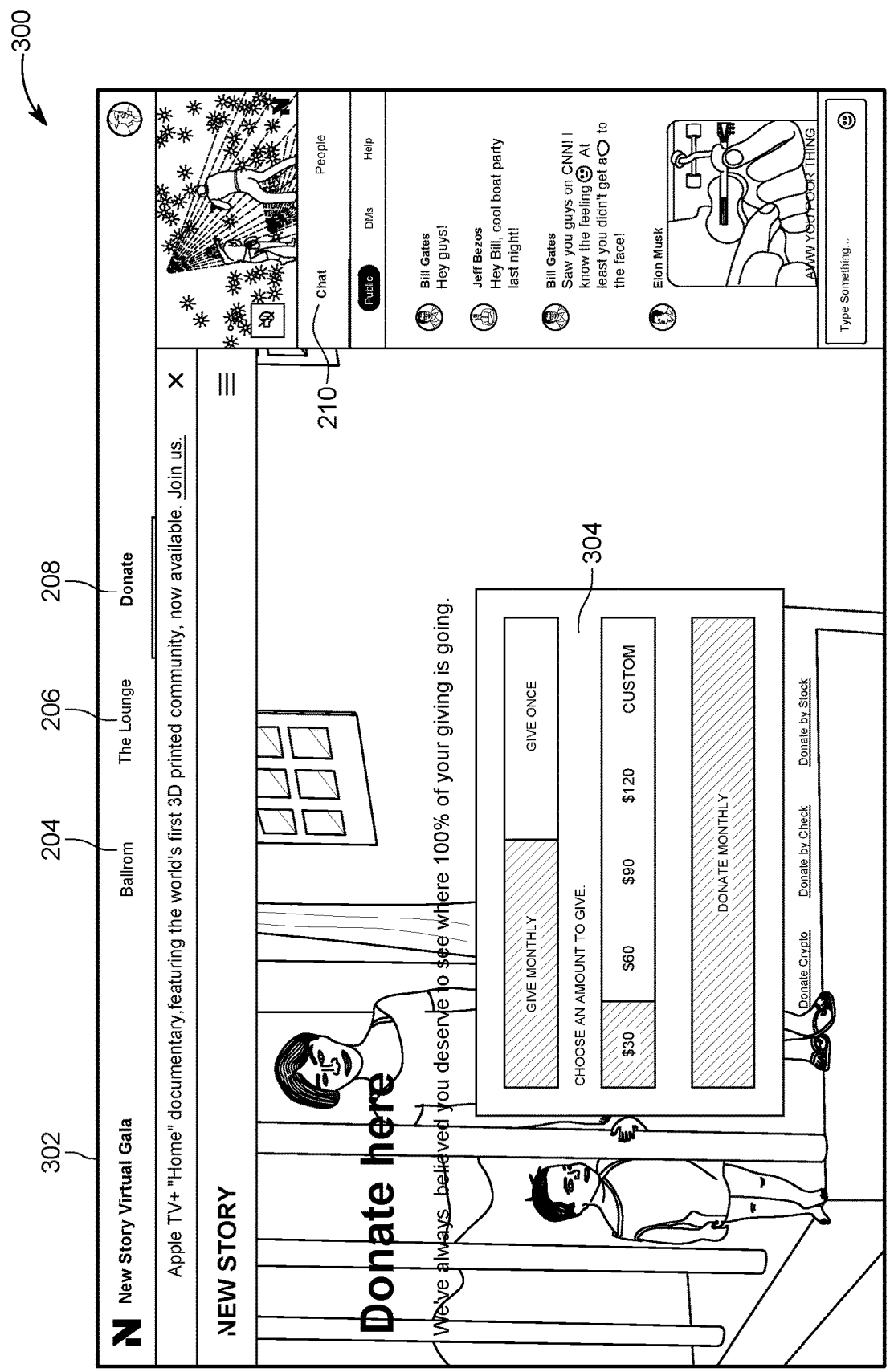
FIG. 3 depicts a diagram illustrating another participant GUI provided to the participant of FIG. 2 providing a donation page in accordance with embodiments of the present disclosure.

FIG. 3 depicts a diagram 300 illustrating a participant GUI 302 provided to the participant of FIG. 2 after selecting the donate selection 208 in accordance with embodiments of the present disclosure. The participant GUI 302 provides multiple donation selections 304 for making a one-time donation or a recurring donation associated the gala. The multiple donation selections 304 also provide for fixed amounts or a custom amount to be entered. The ballroom selection 204 and the lounge selection 206 are also still displayed as in FIG. 2. Additionally the chat window 210 is still displayed as in FIG. 2. The performer and the stage (i.e. the live video) are displayed in a smaller window in the upper right corner of the participant GUI 302 giving the participant they are at the gala as they navigate to make a donation. During and/or after the live video, the participant may select the lounge selection 206 where they may network with other participants via video conferencing.

Figure 4:
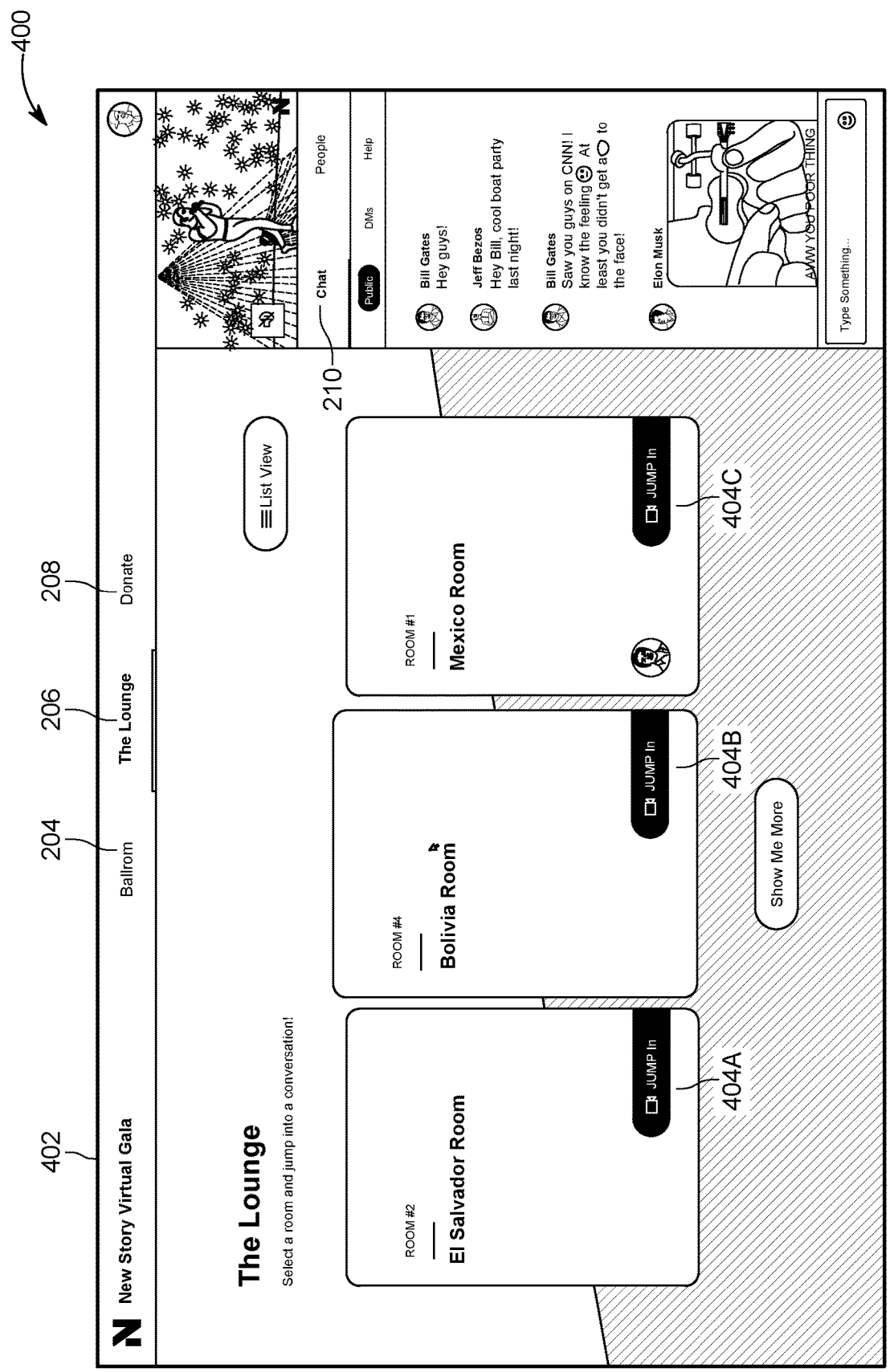
FIG. 4 depicts a diagram illustrating another participant GUI provided to the participant of FIG. 2 providing the lounge functionality in accordance with embodiments of the present disclosure.

FIG. 4 depicts a diagram 400 illustrating a participant GUI 402 provided to the participant of FIG. 2 after selecting the lounge selection in accordance with embodiments of the present disclosure. The participant GUI 402 provides multiple meeting room sections 404A, 404B, and 404C available for networking. In certain embodiments, each room may have a specific theme and/or topic associated with the gala.

Figure 5:
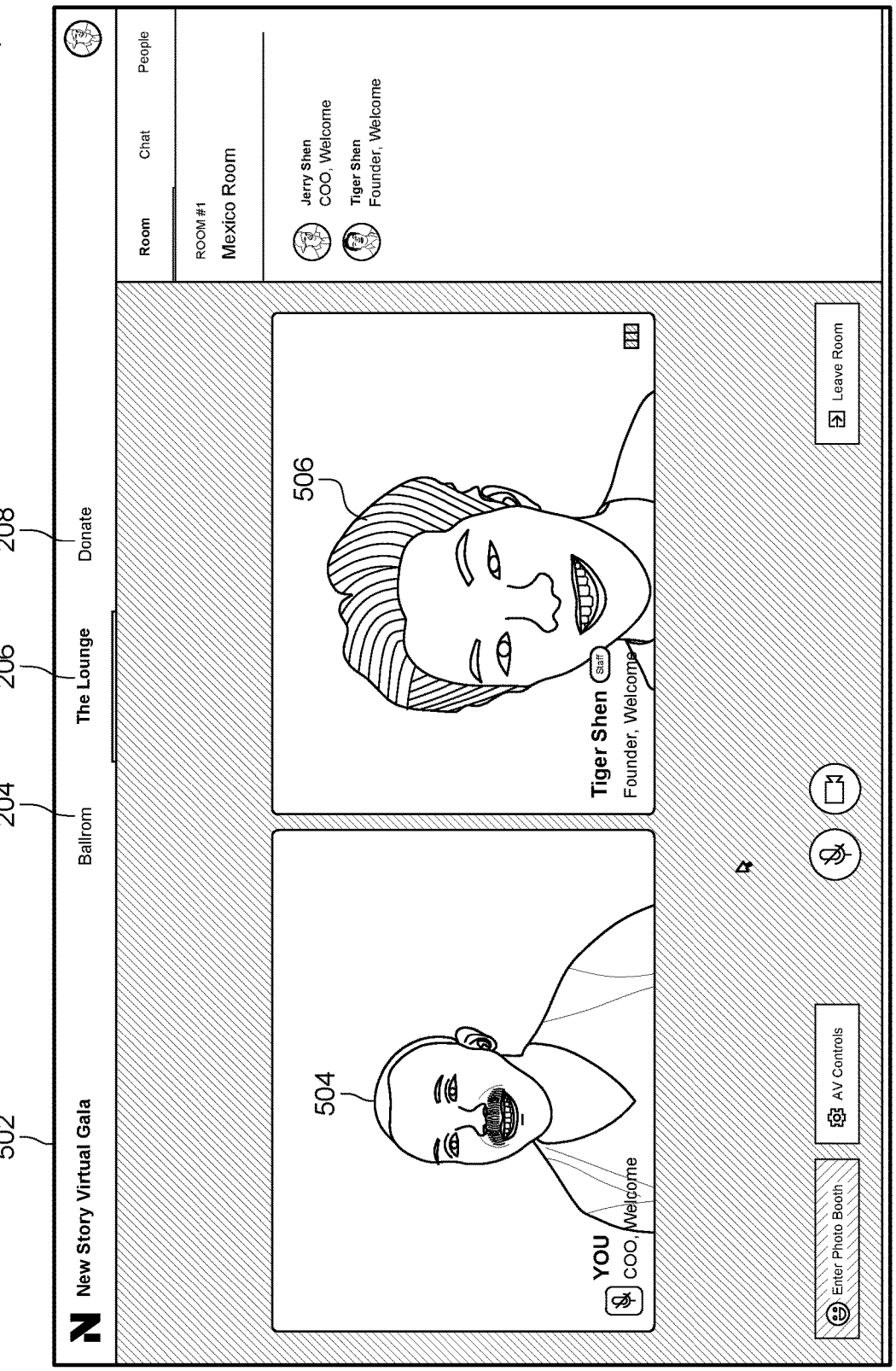
FIG. 5 depicts a diagram illustrating another participant GUI provided to the participant of FIG. 2 after entering a meeting room from the lounge functionality of FIG. 4 in accordance with embodiments of the present disclosure.

FIG. 5 depicts a diagram 500 illustrating a participant GUI 502 provided to the participant 504 of FIG. 2 after entering a meeting room selection (e.g. the Mexico room 404C) from the lounge functionality of FIG. 4 in accordance with embodiments of the present disclosure. The participant 504 is able to video conference with another participant 506 that made the same meeting room selection (e.g. the Mexico room 404C) via the participant GUI 502. A photo booth selection is made available in the lower left of the participant GUI 502. A list of all participants currently in the selected meeting room is depicted on the right side of the participant GUI 502.

Figure 6:
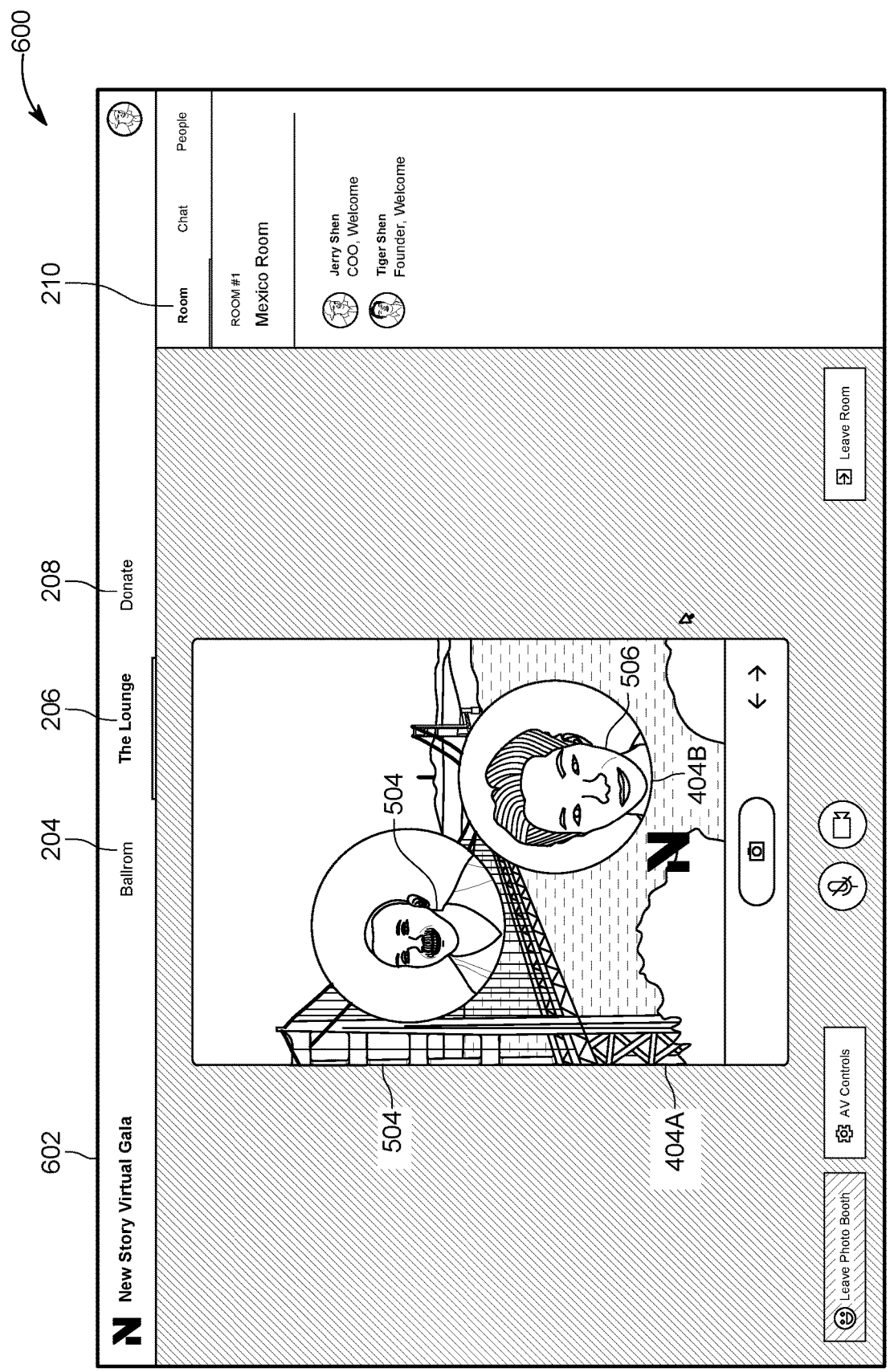
FIG. 6 depicts a diagram illustrating another participant GUI provided to the participant of FIG. 2 after entering the photo booth selection of FIG. 5 providing in accordance with embodiments of the present disclosure.

FIG. 6 depicts a diagram 600 illustrating a participant GUI 602 provided to the participant 504 of FIG. 2 after entering the photo booth selection of FIG. 5 in accordance with embodiments of the present disclosure. As depicted, the participant 506 has also entered the photo booth selection. Left and right arrows are available for adjusting the background image. Currently displayed is the Golden Gate Bridge as a background. Either participant 504 or 506 may take a snapshot using the camera button. The photo booth image may be made available for purchase to participant 504 and participant 506. Additionally the photo booth image may be made available for free as part of registration fees associated with the interactive virtual event.

In another embodiment, the Welcome® system (FIG. 7 through FIG. 14) is disclosed as providing a plurality of production control room GUIs for facilitating another interactive virtual event named "YC S20 Virtual Demo Day" (e.g. an investment conference having a plurality of start-up company participants/speakers presenting to and networking with a plurality of investor participants). In a preferred arrangement each participant would have an Internet connection of at least 50 megabits/second downstream and at least 10 megabits/second upstream, a camera capable of 1920×1080 progressive scan resolution (30 frames/second), and a high quality microphone such as the "Blue Yeti®" universal serial bus (USB) microphone.

Figure 7:
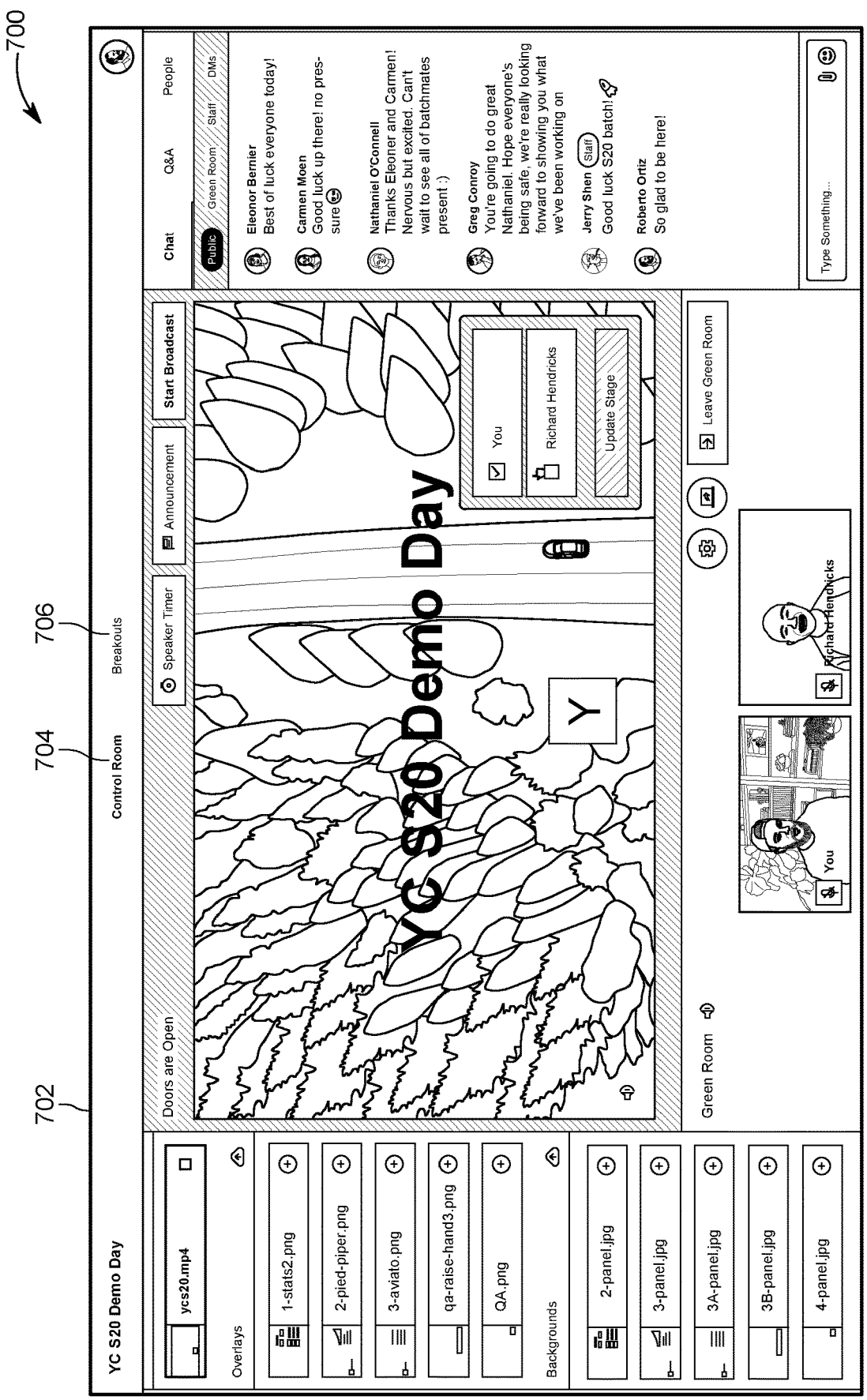
FIG. 7 depicts a diagram illustrating a production control GUI for providing event coordinator management capabilities for another interactive virtual event in accordance with embodiments of the present disclosure.

FIG. 7 depicts a diagram 700 illustrating a production control GUI 702 for providing an event coordinator (e.g. a producer) with management capabilities for this interactive virtual event in accordance with embodiments of the present disclosure. The event coordinator may also be an active participant and a speaker/presenter for the interactive virtual event as described with this embodiment using Michael Seibel as the event coordinator. The production control GUI 702 displays an introduction video being displayed for participants "YC S20 Virtual Demo Day". Preferably the introduction video plays as the participants arrive for the interactive virtual event. As shown, the introduction video was selected by the event coordinator from a file list on the left side of the production control GUI 702. Other files for selection by the event coordinator include overlays for the speaker participants and backgrounds as needed The production control GUI 702 provides for prescreening of upcoming speakers in a window labeled "Green Room". Currently, the event coordinator "You" (actually Michael Seibel) and the next speaker/participant named Richard Hendricks (a startup company founder) are displayed and may A/V conference with each other as necessary. The production control GUI 702 further allows the event coordinator to select speaker/participants from the "Green Room" window and update the stage (i.e. provide to all the participants) when ready and their timeslot becomes available.

The event coordinator may also invite additional attendees to the "Green Room". A control room section 704 and a breakouts selection 706 allow the event coordinator to toggle between control room functionality and potentially other breakouts (i.e. rooms for coordinating the interactive virtual event. In some embodiments, up to eight speaker/participants may be pre-queued in the "Green Room." In other embodiments, more than eight speaker/participants may be pre-queued.

In certain embodiments, multiple event coordinators may be supported with the Welcome® system each having their own production control GUI via their own work station. Additionally all the event coordinators may be active participants in the interactive virtual event.

Figure 8:
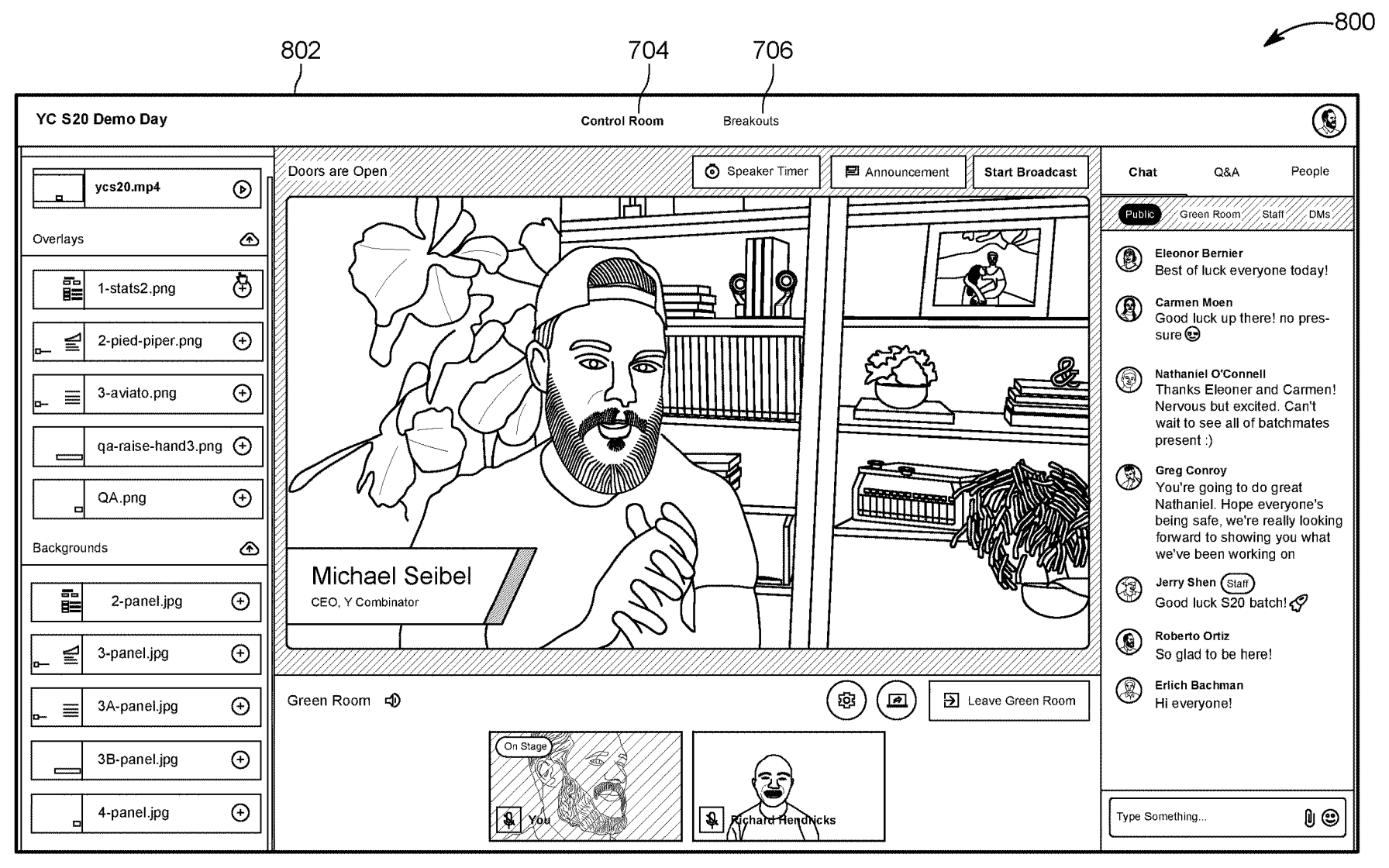

FIG. 8 depicts a diagram 800 illustrating a production control GUI 802 provided to the event coordinator (i.e. Michael Seibel) of FIG. 7 in accordance with embodiments of the present disclosure. Michael Seibel is now depicted as presenting to the plurality of participants upon the update stage selection. An event badge momentarily displays "Michael Seibel CEO, Y Combinator." The event badge is branded and white labeled. Richard Hendricks is still queued in the "Green Room" as the next speaker. The event coordinator may have prequalified Richard Hendricks' video and audio (i.e. camera and microphone) once entering the "Green Room." Additionally, the event coordinator may have preset a speaker timer for Richard Hendricks.

Figure 9:
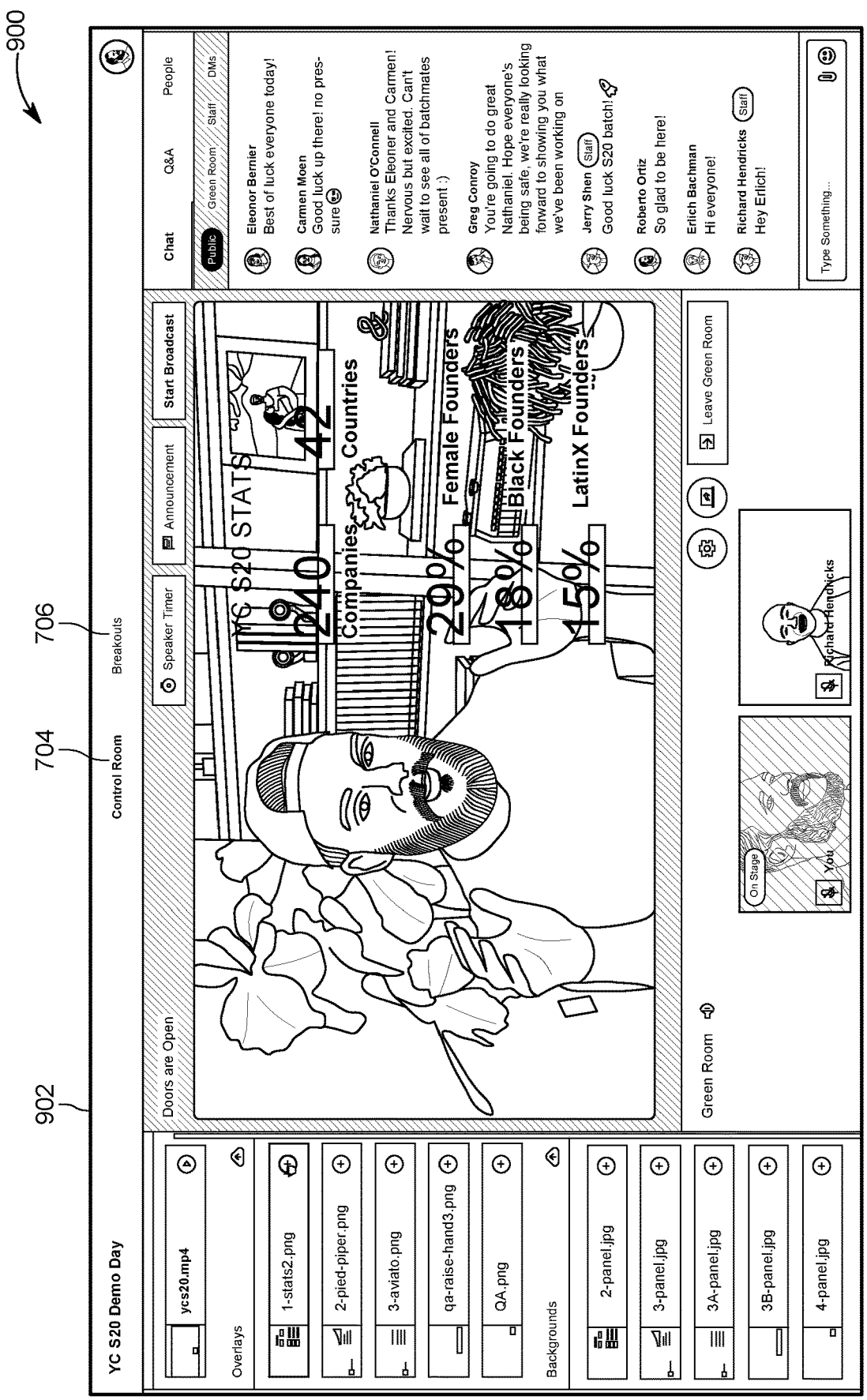
FIG. 9 depicts a diagram illustrating another production control GUI provided to event coordinator of FIG. 7 in accordance with embodiments of the present disclosure.

FIG. 9 depicts a diagram 900 illustrating a production control GUI 902 provided to the event coordinator (i.e. Michael Seibel) of FIG. 7 in accordance with embodiments of the present disclosure. The event coordinator (i.e. Michael Seibel) has added an overlay file (i.e. 1-stats2.png) to his introduction presentation from the left of the production control GUI 902

Figure 10:
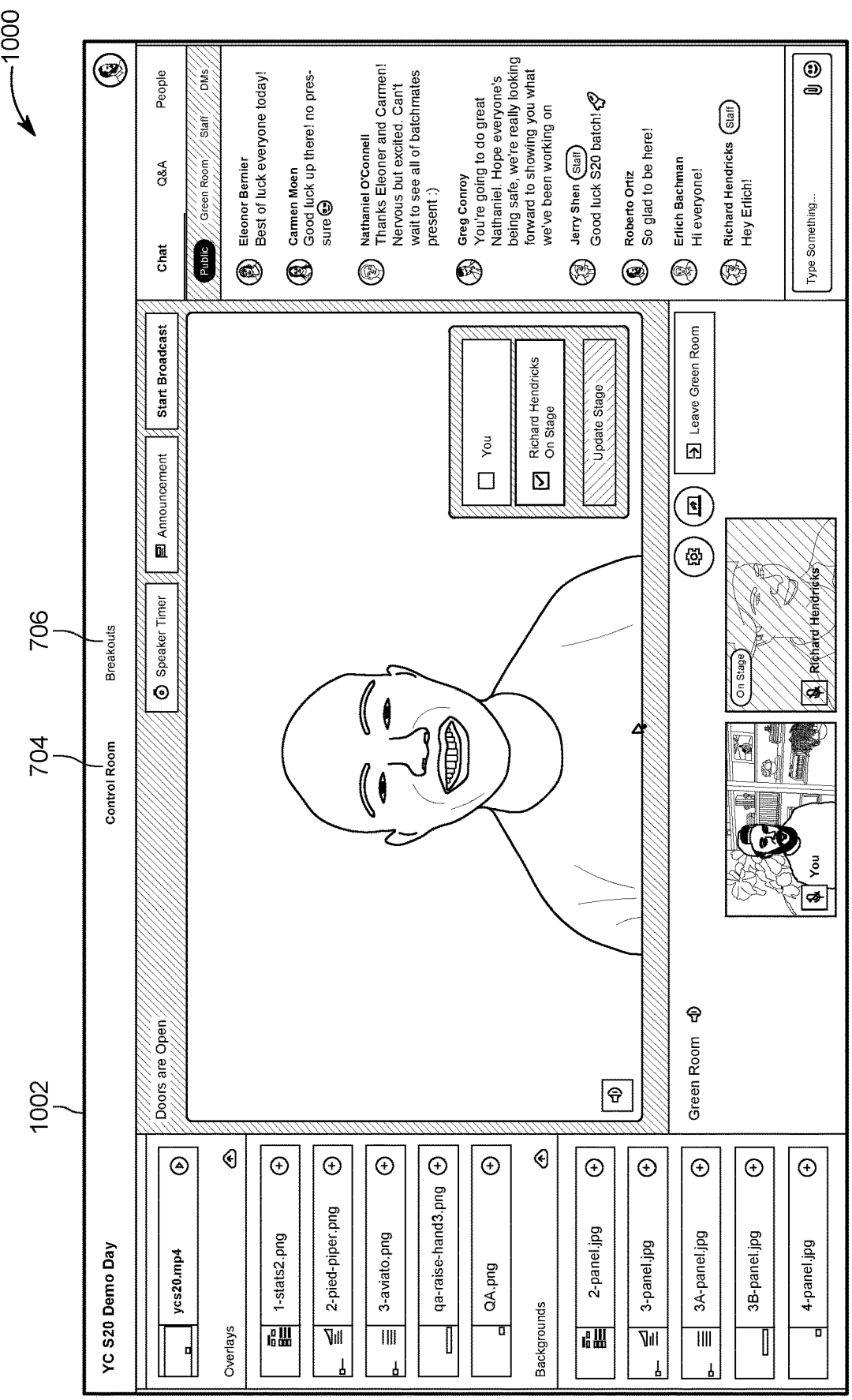
FIG. 10 depicts a diagram illustrating another production control GUI provided to event coordinator of FIG. 7 in accordance with embodiments of the present disclosure.

FIG. 10 depicts a diagram 1000 illustrating a production control GUI 102 provided to the event coordinator (i.e. Michael Seibel) of FIG. 7 in accordance with embodiments of the present disclosure. In the production control GUI, the event coordinator changed the broadcasted presenter to Richard Hendricks via the update stage selection.

Figure 11:
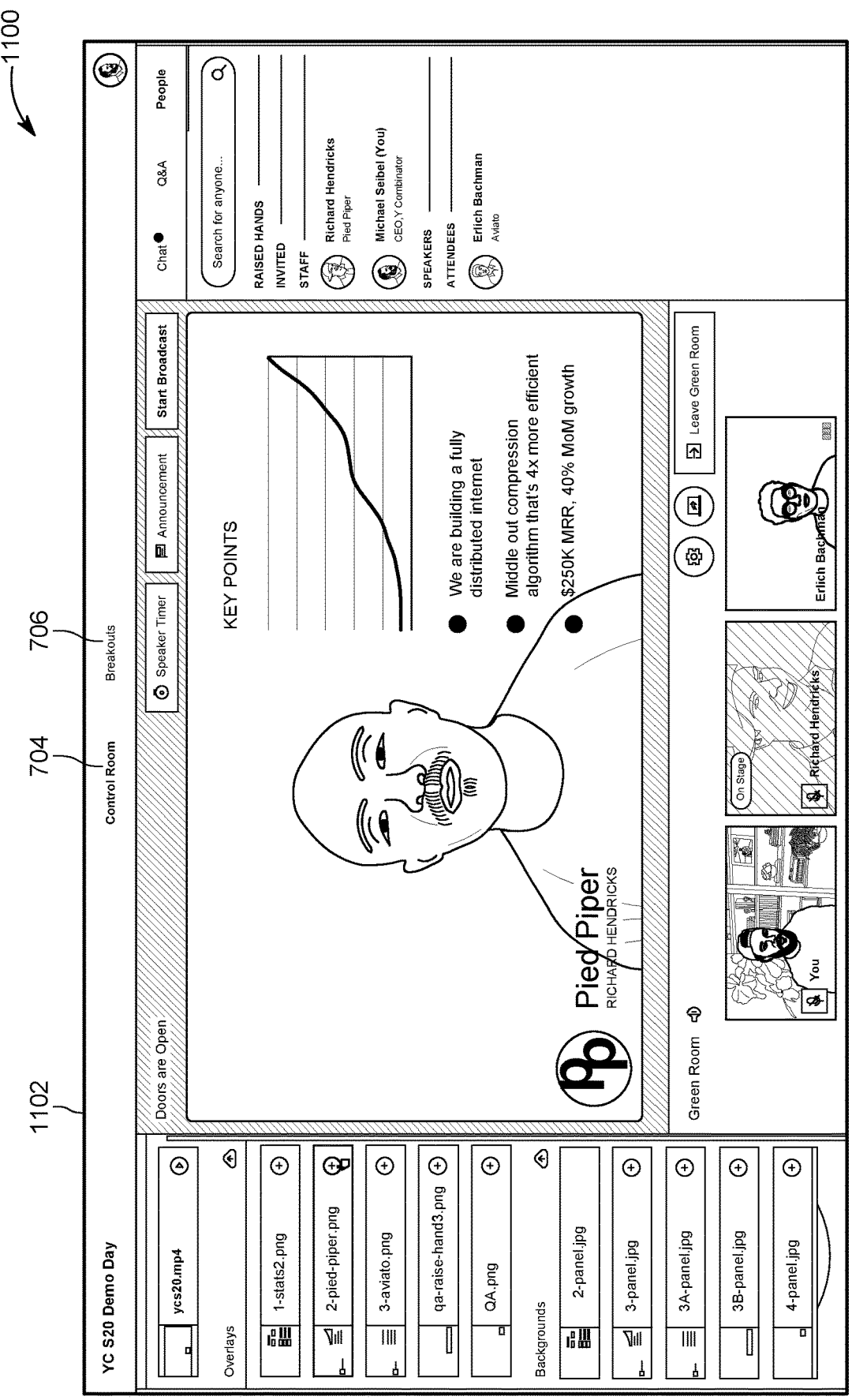
FIG. 11 depicts a diagram illustrating another production control GUI provided to event coordinator of FIG. 7 in accordance with embodiments of the present disclosure.

FIG. 11 depicts a diagram 1100 illustrating a production control GUI 1102 provided to the event coordinator (i.e. Michael Seibel) of FIG. 7 in accordance with embodiments of the present disclosure. Richard Hendricks event badge with company logo for Pied Piper is displayed. Additionally his overlay file (2pied-piper.png) has been added to his broadcast display to display important information about Pied Piper. The next presenter Erich Backman is now queued in the "Green Room". The event coordinator may have prequalified Erich Backman's video and audio (i.e. camera and microphone) once entering the "Green Room." Additionally, the event coordinator may have preset a speaker timer for Erich Backman's presentation.

Figure 12:
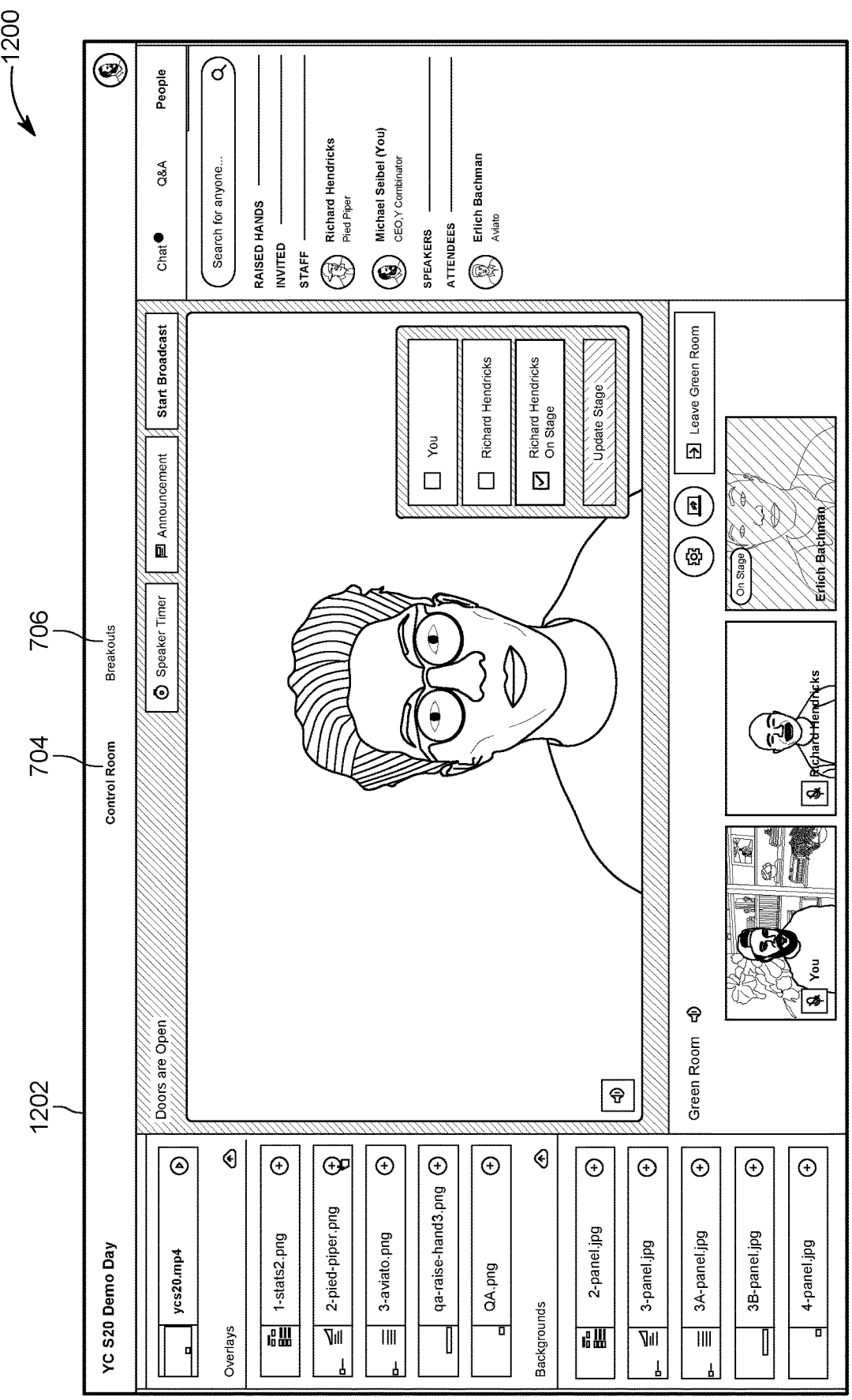
FIG. 12 depicts a diagram illustrating another production control GUI provided to event coordinator of FIG. 7 in accordance with embodiments of the present disclosure.

FIG. 12 depicts a diagram 1200 illustrating a production control GUI 1202 provided to event coordinator (i.e. Michael Seibel) of FIG. 7 in accordance with embodiments of the present disclosure. Erich Backman has now been put into the main broadcast using the update stage selection by the event coordinator.

Figure 13:
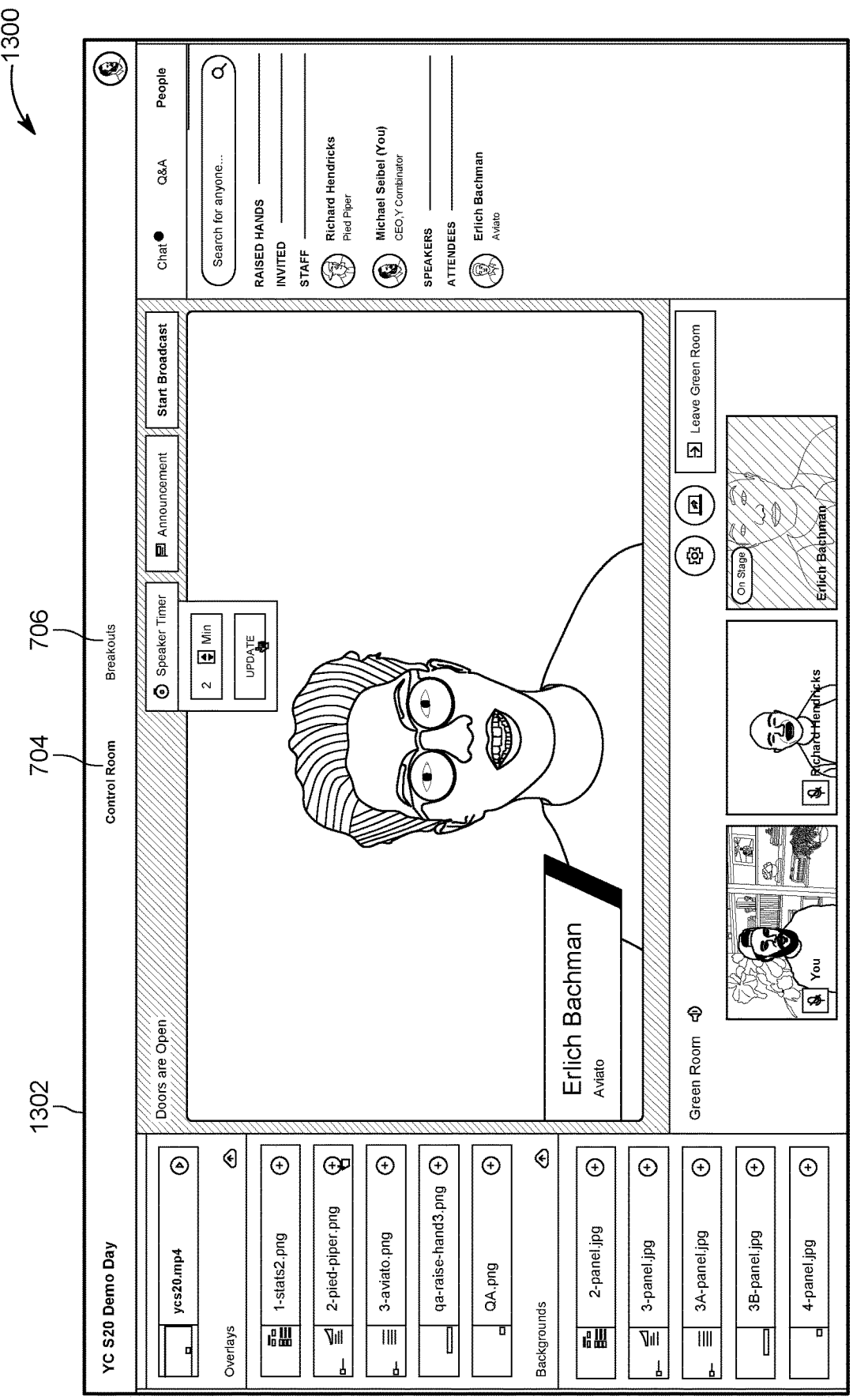
FIG. 13 depicts a diagram illustrating another production control GUI provided to event coordinator of FIG. 7 in accordance with embodiments of the present disclosure.

FIG. 13 depicts a diagram 1300 illustrating a production control GUI 1302 provided to event coordinator (i.e. Michael Seibel) of FIG. 7 in accordance with embodiments of the present disclosure. The production control GUI 1302 now depicts the event badge for Erlich Backman and his company Aviato. A pull down menu also allows the event coordinator to update a speaker timer for Erlich Backman.

Figure 14:
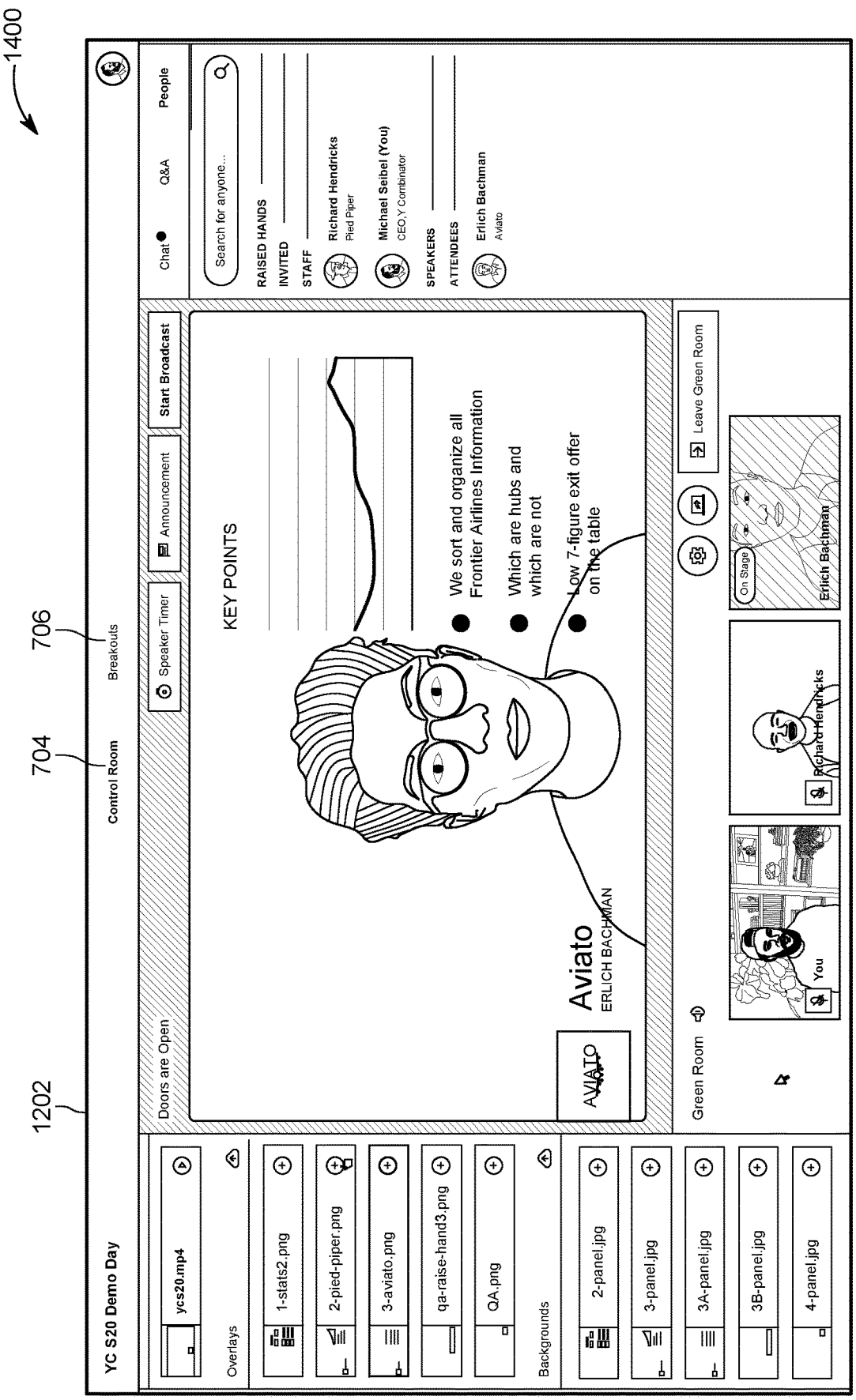
FIG. 14 depicts a diagram illustrating another production control GUI provided to event coordinator of FIG. 7 in accordance with embodiments of the present disclosure.

FIG. 14 depicts a diagram 1400 illustrating a production control GUI 1402 provided to event coordinator (i.e. Michael Seibel) of FIG. 7 in accordance with embodiments of the present disclosure After all presentations are finished, the investors and startup company presenters may enter the lounge area of the Welcome® system. The lounge area may have separate rooms as described in the previous gala embodiment. Each presenter may have their separate meeting room for networking with individual investors. In other embodiments, each investor may their separate meeting room for networking with presenters.

In another embodiment, the Welcome® system (FIG. 15 through FIG. 21) is further disclosed as providing a plurality of participant GUIs as related to the embodiment described in FIG. 7 through FIG. 14 of the UC S20 Virtual Demo Day from the perspective of participant Erlich Bachman.

Figure 15:
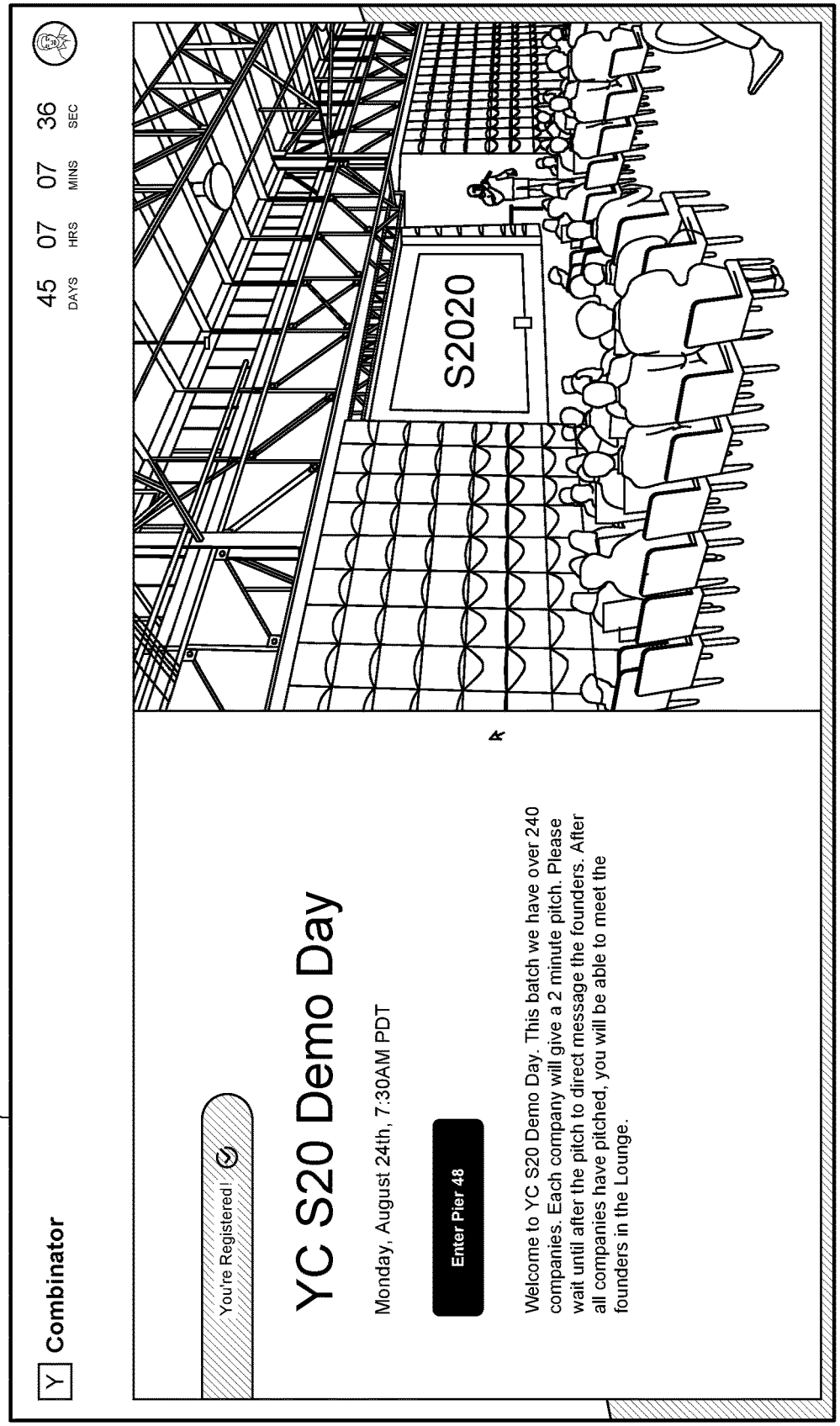
FIG. 15 depicts a diagram illustrating another participant GUI for participation in the interactive virtual event of FIG. 7 through FIG. 14 in accordance with embodiments of the present disclosure.

FIG. 15 depicts a diagram 1500 illustrating a participant GUI 1502 for participant Erlich Bachman in the interactive virtual event of FIG. 7 through FIG. 14 in accordance with embodiments of the present disclosure). The participant GUI 1502 depicts a completed registration page associated with the interactive virtual event. As depicted, Erlich Bachman has finished registration and can now enter the main event by clicking the labeled button "Enter Pier 48".

Figure 16:
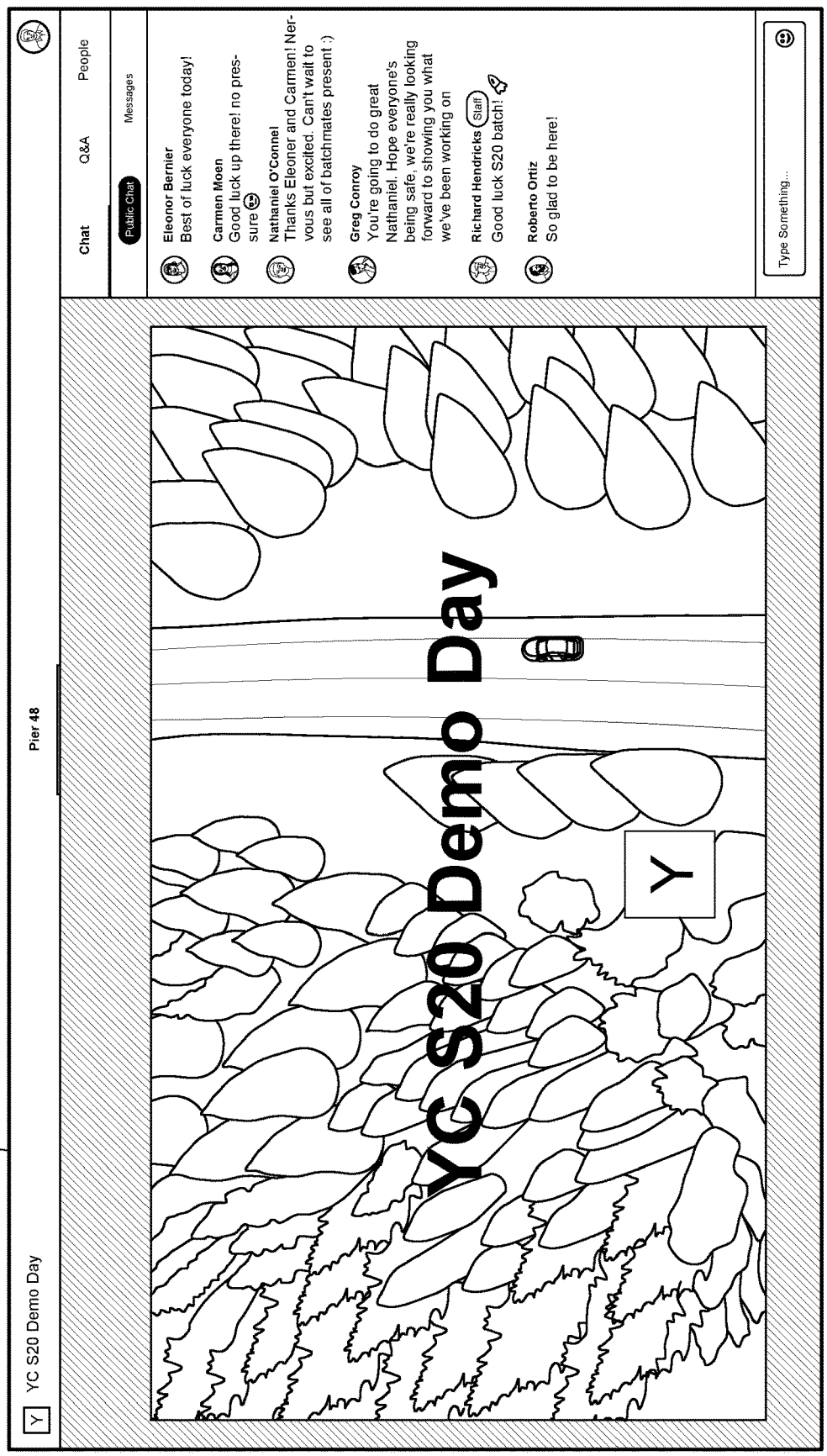
FIG. 16 depicts a diagram illustrating another participant GUI for participation in the interactive virtual event of FIG. 7 through FIG. 14 in accordance with embodiments of the present disclosure.

FIG. 16 depicts a diagram 1600 illustrating a participant GUI 1602 for participant Erlich Bachman in the interactive virtual event of FIG. 7 through FIG. 14 in accordance with embodiments of the present disclosure. In the participant GUI 1602, Erlich Bachman is viewing the UC S20 Demo Day introduction video as previously described in FIG. 7

Figure 17:
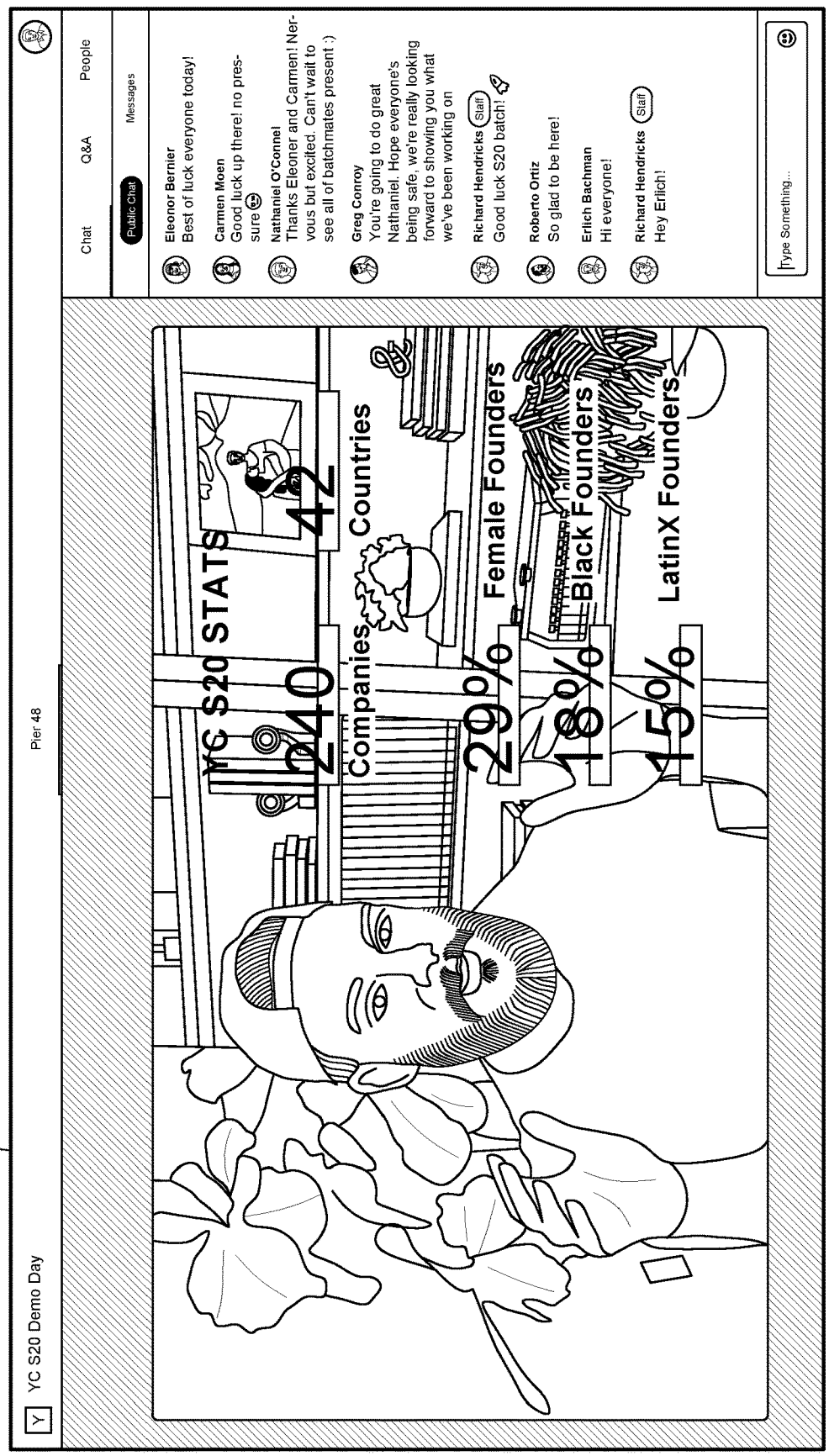
FIG. 17 depicts a diagram illustrating another participant GUI for participation in the interactive virtual event of FIG. 7 through FIG. 15 in accordance with embodiments of the present disclosure.

FIG. 17 depicts a diagram 1700 illustrating a participant GUI 1702 for participant Erlich Bachman in the interactive virtual event of FIG. 7 through FIG. 14 in accordance with embodiments of the present disclosure. In the participant GUI 1702, Erlich Bachman is viewing the presentation of Michael Seibel (i.e. event coordinator) as previously described in FIG. 9.

Figure 18:
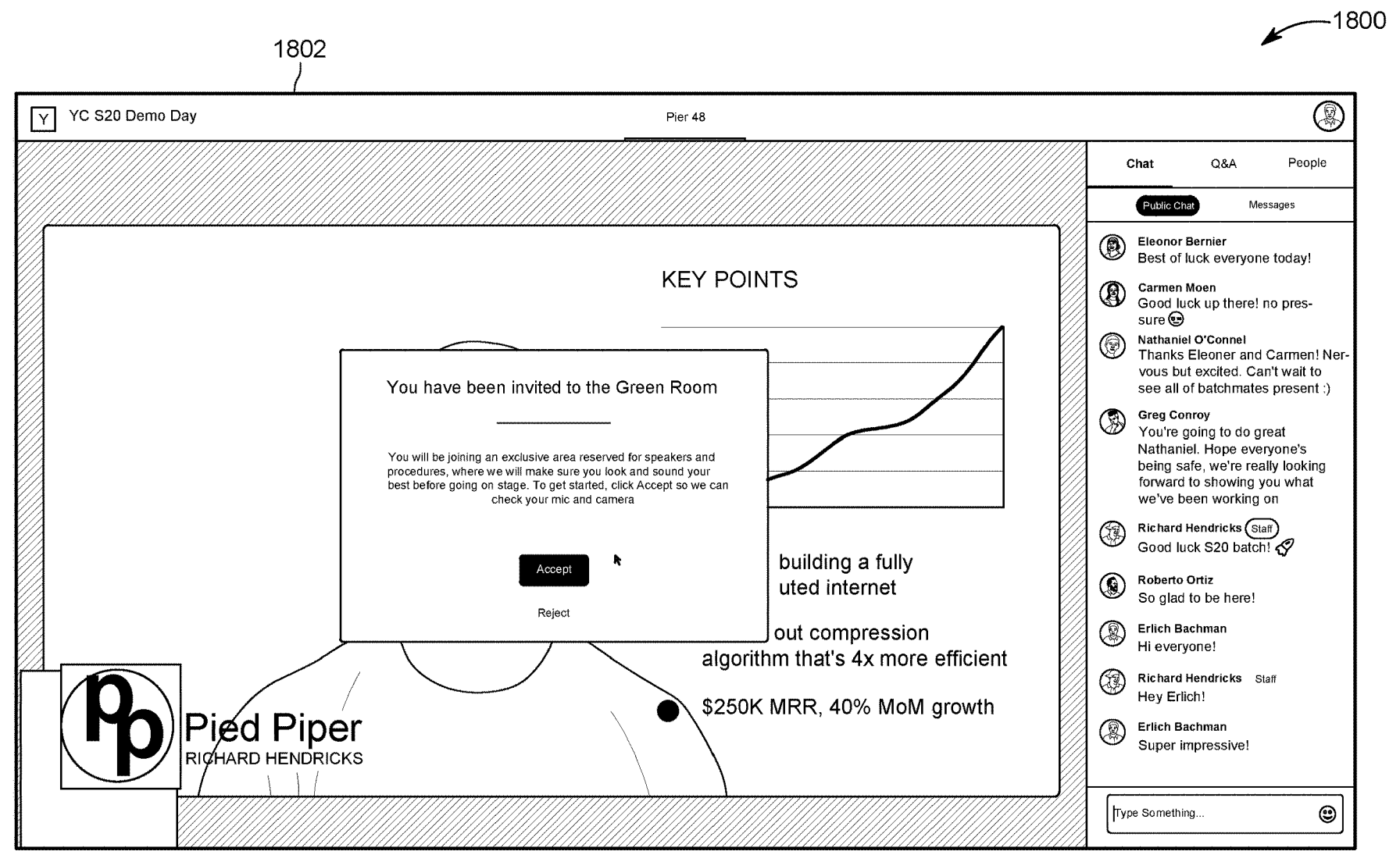

FIG. 18 depicts a diagram 1800 illustrating a participant GUI 1802 for participant Erlich Bachman in the interactive virtual event of FIG. 7 through FIG. 14 in accordance with embodiments of the present disclosure. In the participant GUI 1802, Erlich Bachman receives an invitation from Michael Seibel (i.e. event coordinator) to enter the "Green Room" and prepare for his presentation.

Figure 19:
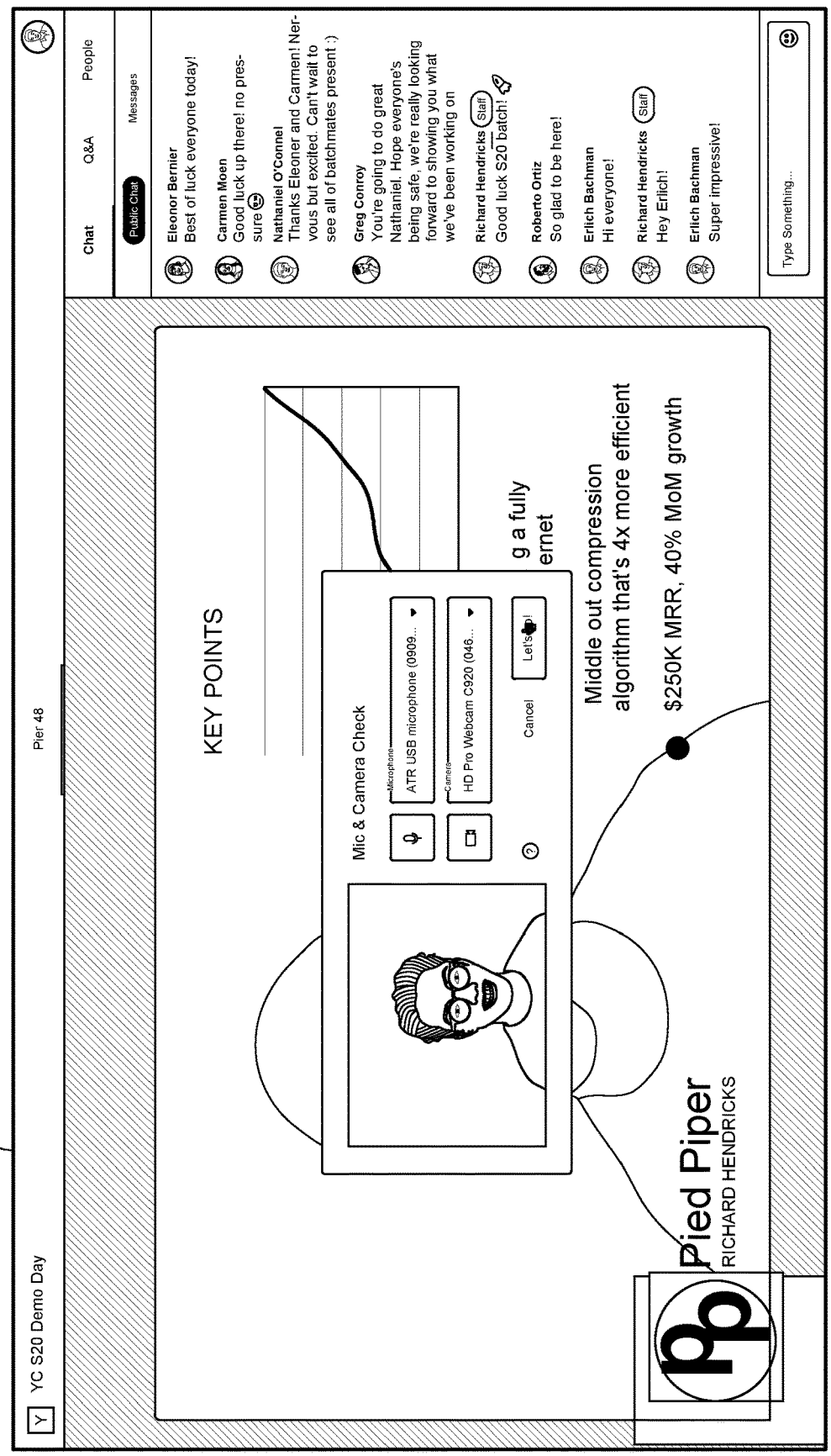
FIG. 19 depicts a diagram illustrating another participant GUI for participation in the interactive virtual event of FIG. 7 through FIG. 15 in accordance with embodiments of the present disclosure.

FIG. 19 depicts a diagram 1900 illustrating a participant GUI 1902 for participant Erlich Bachman in the interactive virtual event of FIG. 7 through FIG. 14 in accordance with embodiments of the present disclosure. In the participant GUI 1902, Erlich Bachman has entered the "Green Room" and is completing a microphone and camera check with Michael Seibel (i.e. event coordinator).

Figure 20:
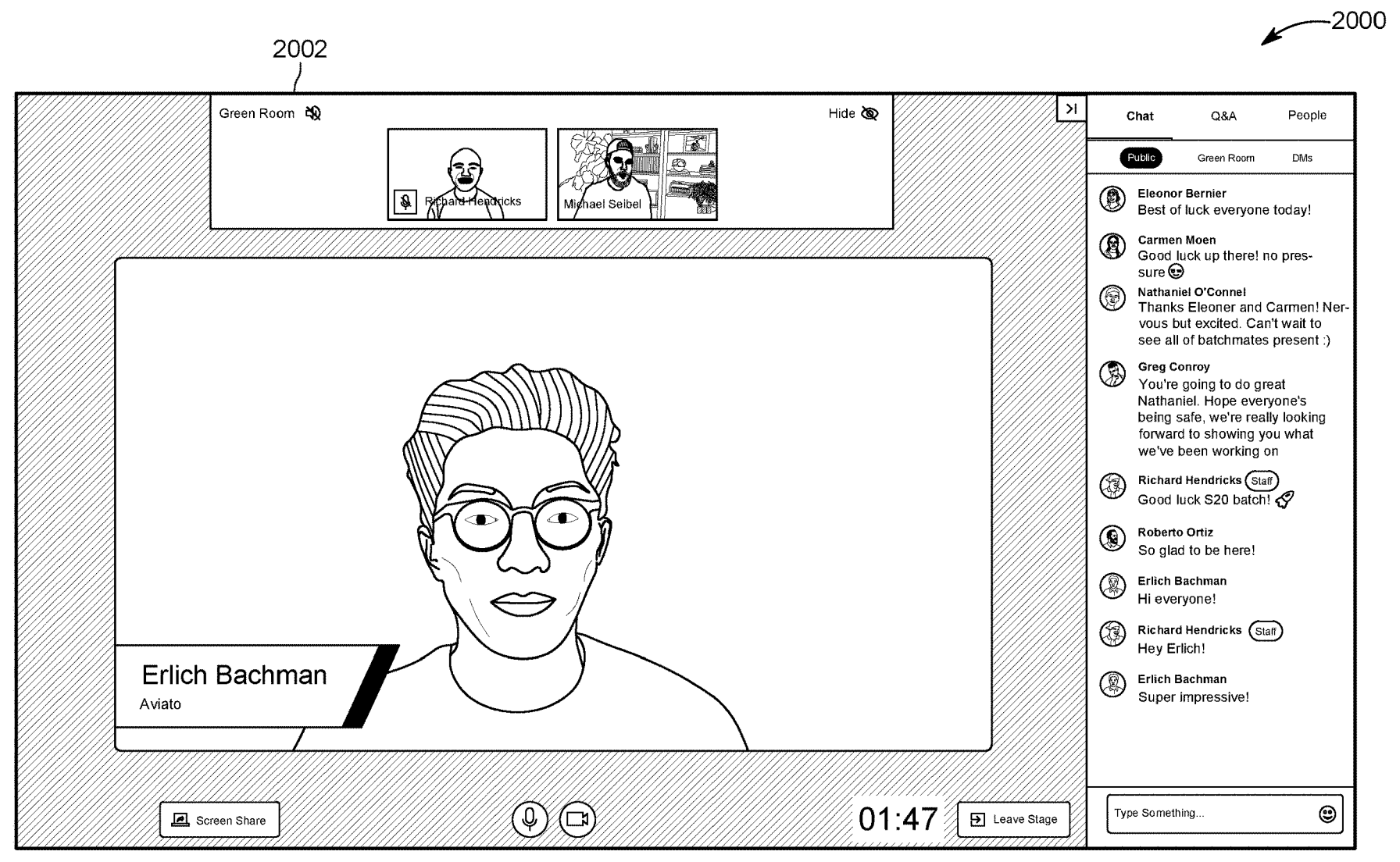

FIG. 20 depicts a diagram 2000 illustrating a participant GUI 2002 for participant Erlich Bachman in the interactive virtual event of FIG. 7 through FIG. 14 in accordance with embodiments of the present disclosure. In the participant GUI 2002, Erlich Bachman is now on stage by selection of Michael Seibel (i.e. event coordinator) and as previously described in FIG. 13. The "Green Room" is displayed in a small window at the top of participant GUI 2002. The participant GUI 2002 also gives Erlich Bachman selections to mute his video and/or audio.

Figure 21:
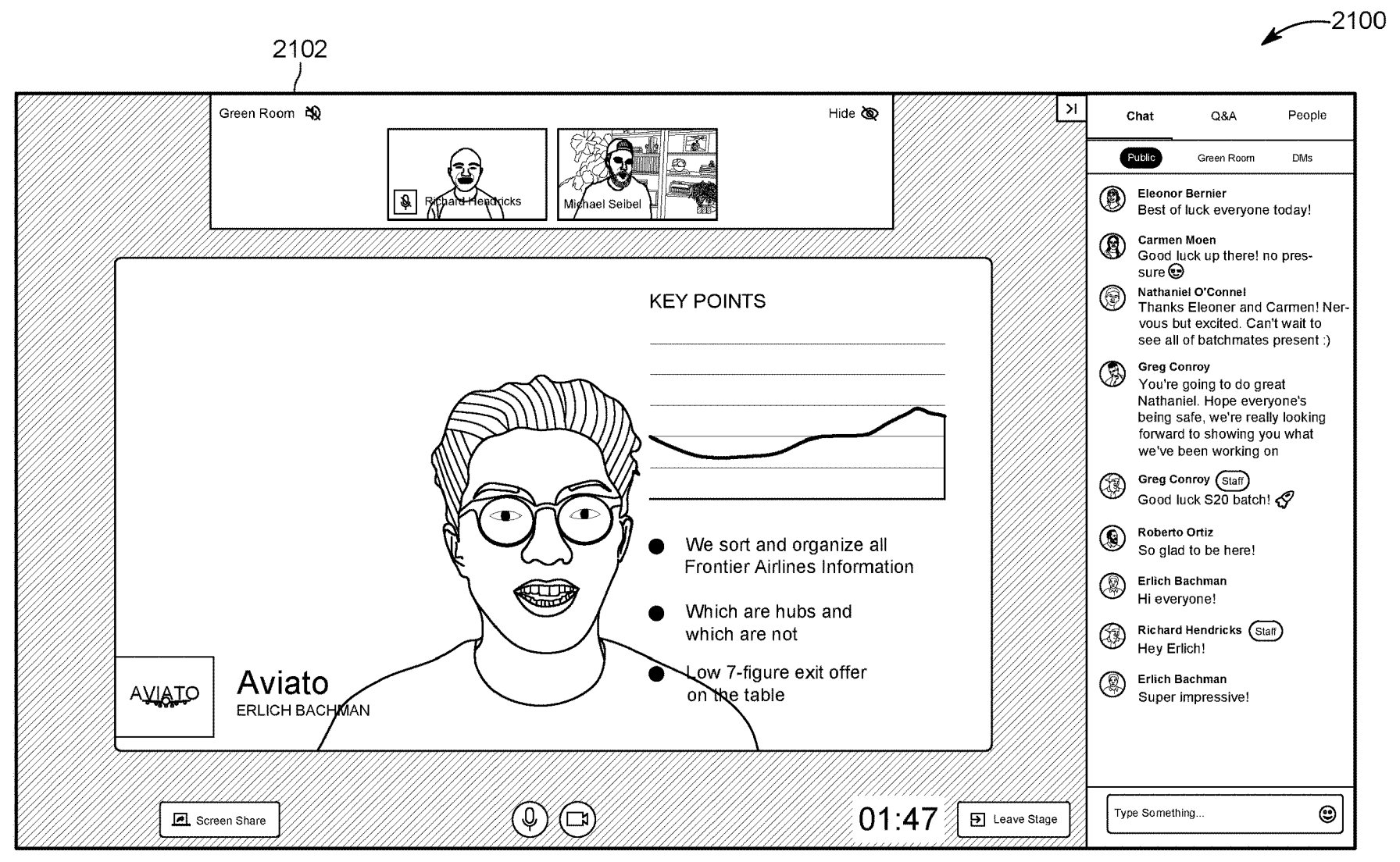

FIG. 21 depicts a diagram 2100 illustrating a participant GUI 2102 for participant Erlich Bachman in the interactive virtual event of FIG. 7 through FIG. 14 in accordance with embodiments of the present disclosure. In the participant GUI 2102, Erlich Bachman is on stage presenting with his overlay screen to potential investors as previously described in FIG. 14.

Figure 22:
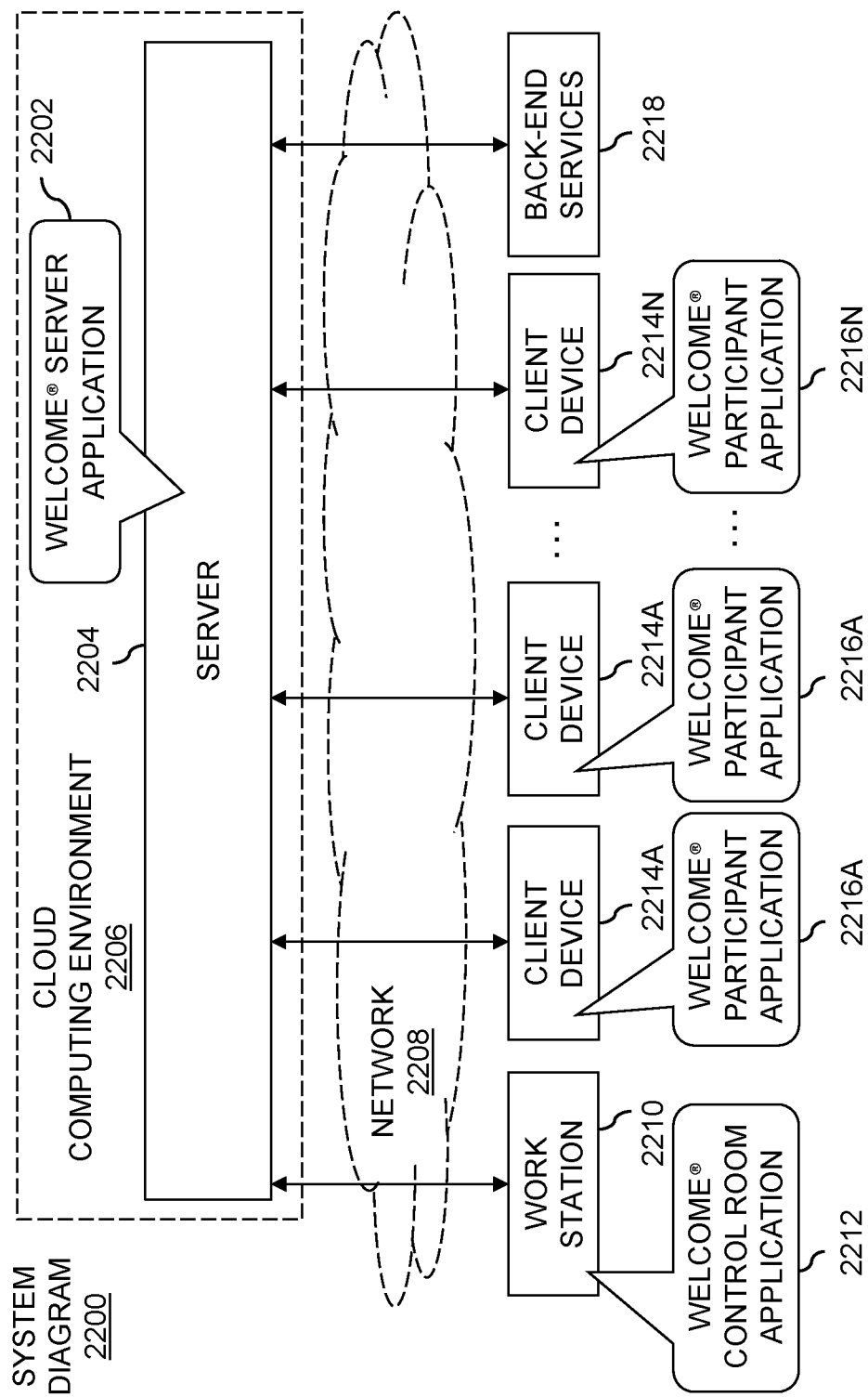
FIG. 22 depicts a system diagram illustrating a client/server architecture for facilitating an interactive virtual event in accordance with embodiments of the present disclosure.

FIG. 22 depicts a system diagram 2200 illustrating the Welcome® system implemented as a client/server architecture for facilitating an interactive virtual event using the in accordance with embodiments of the present disclosure. The client/server architecture includes a Welcome® server application 2202 hosted on a server 2204. The server 2204 is resident in a cloud based computing environment 2206. In other embodiments, the server 2204 may be housed at a business location and/or other type of datacenter.

The server 2204 is configured to communicate over a network 2208 with at least one workstation 2210. The network 2208 may be any type or combination of wired, wireless, and/or optical networks. The network 2208 may also include any combination of wide area networks and/or local area networks. The network 2208 may also include the Internet. The workstation 2210 is configured to host the Welcome® control room application 2212. The server 2205 is also configured to communicate over the network 2208 to a plurality of client devices 2214A-2214N, configured to host a plurality of Welcome® participant applications 2216A-2216N. The client devices 2214A-2214N may be any combination of fixed devices and/or mobile devices. Fixed devices may include any combination of personal computers, workstations, smart TVs, or the like. Mobile devices may include any combination of smart phones, tablets, laptops, smart watches, or the like.

The Welcome® control room application 2212 is configured to provide a production control GUI to an event coordinator. The Welcome® control room application 2212 may be a stand-alone application or may be configured to operate within a web browser. The web browser may be a Microsoft Internet Explorer® browser, a Microsoft Edge® browser, an Apple Safari® browser, a Google Chrome® browser, a Mozilla Firefox® browser, an Opera® browser, or the like.

The Welcome® participant applications 2216A-2216N are configured to provide participant GUIs to a plurality of participants of the interactive virtual event. The Welcome® participant applications 2216A-2216N may be stand-alone applications or may be configured to operate within a web browser. The web browser may be a Microsoft Internet Explorer® browser, a Microsoft Edge® browser, an Apple Safari® browser, a Google Chrome® browser, a Mozilla Firefox® browser, an Opera® browser, or the like.

Additionally, the Welcome® server application 2202 may communicate using one or more backend application programming interfaces (APIs) to one or more back-end services 2218. The backend APIs may communicate within the cloud based computing environment 2206 and/or over the network 2208 to remote facilities The server 2204 with the Welcome® server application 2202 may perform any of the methods described herein. The Welcome® server application 2202 transforms the server 2204 from a generic computer function into a machine for facilitating an interactive virtual event.

Figure 23:
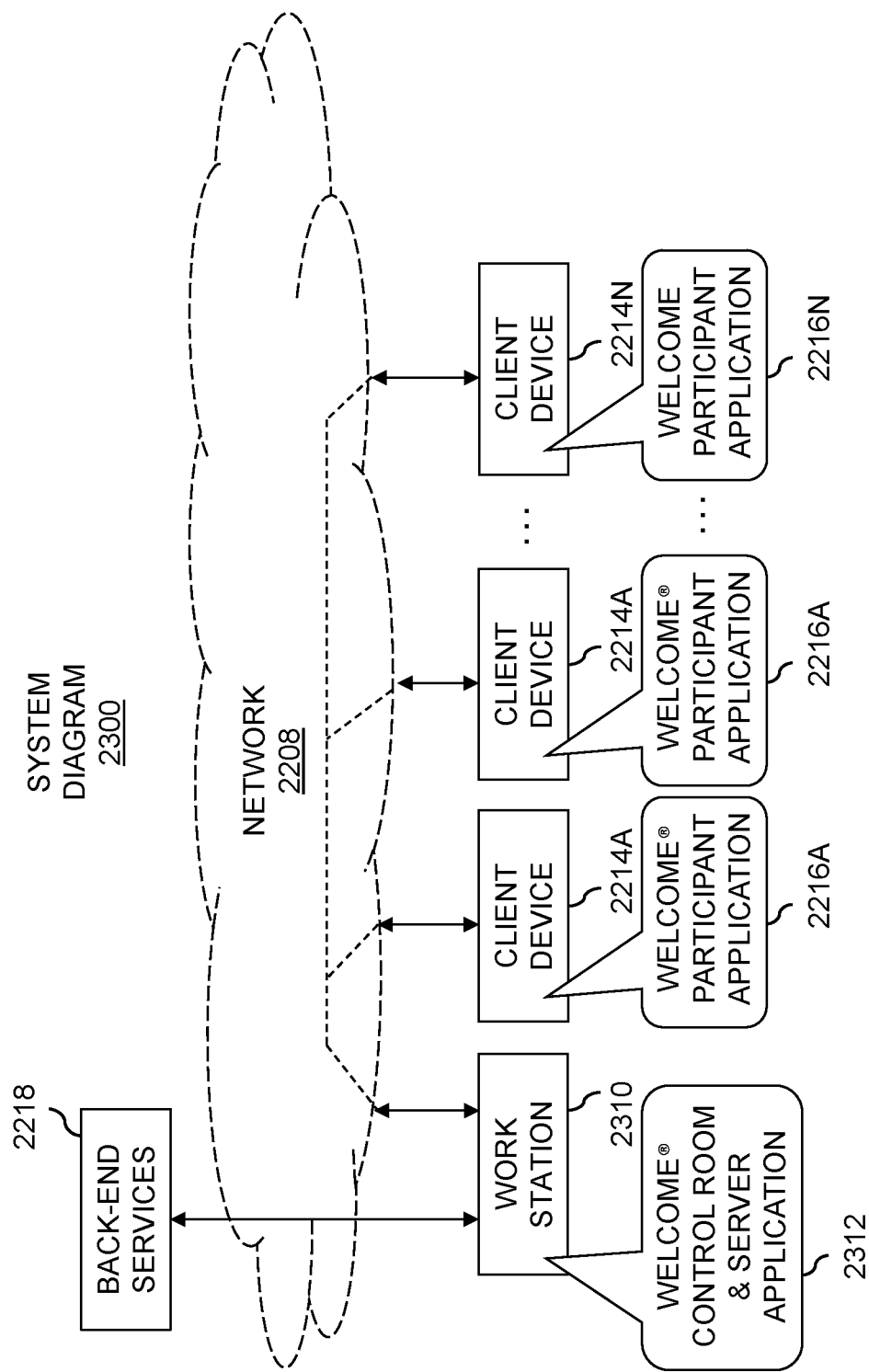
FIG. 23 depicts a system diagram illustrating a client only distributed architecture for facilitating an interactive virtual event in accordance with embodiments of the present disclosure.

FIG. 23 depicts a system diagram 2300 illustrating a client only distributed architecture for facilitating an interactive virtual event in accordance with embodiments of the present disclosure. The functionality of the server 2204 and the Welcome® server application 2202 of FIG. 22 are incorporated into the workstation 2310 and Welcome® control room and server application 2312.

Figure 24:
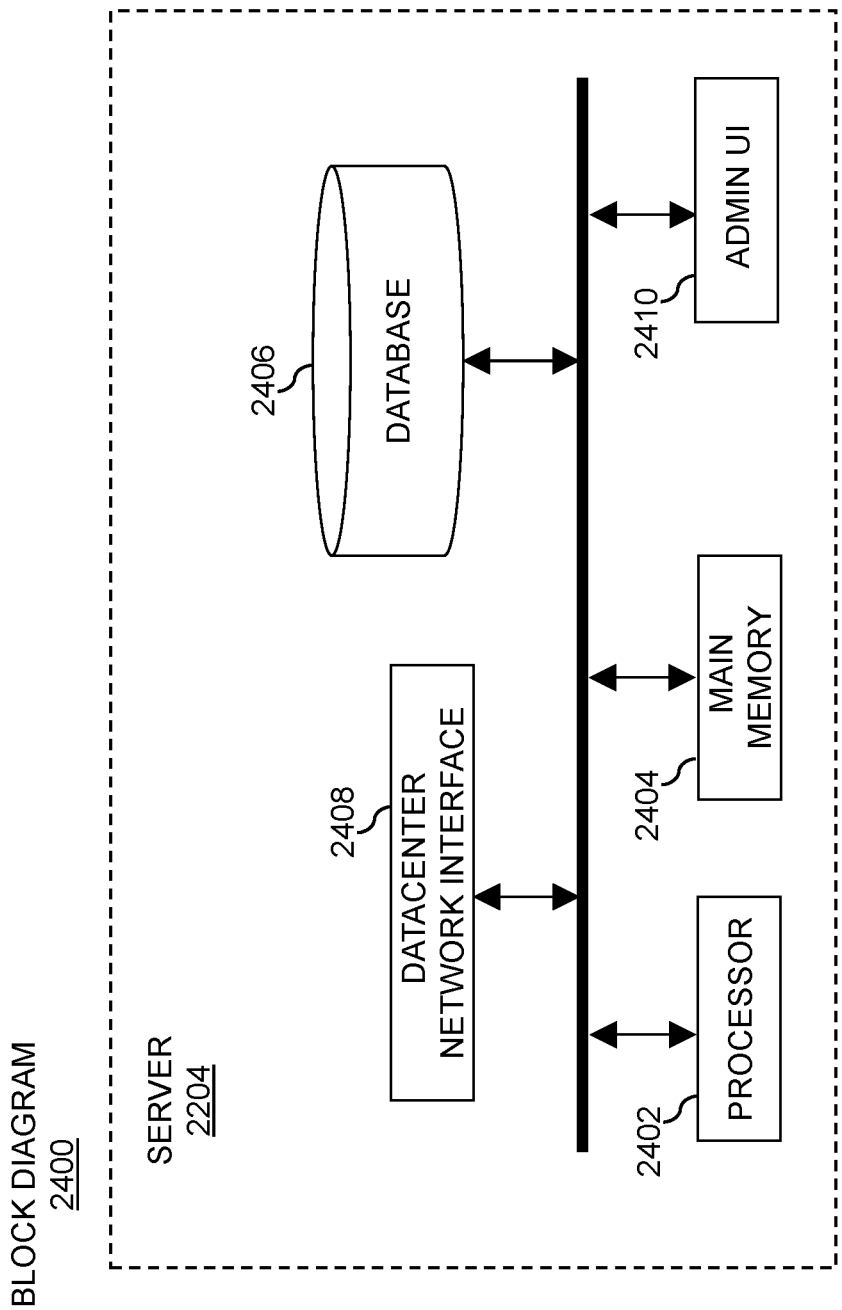
FIG. 24 depicts a block diagram illustrating a server representative of a server of FIG. 22 in accordance with embodiments of the present disclosure.

FIG. 24 depicts a block diagram 2400 illustrating the server representative of FIG. 22 in accordance with embodiments of the present disclosure. The server 2204 includes at least one processor 2402, a main memory 2404, a storage memory (e.g. database) 2406, a datacenter network interface 2408, and an administration user interface 2410. The server 2204 may be configured to host an Ubuntu® server or the like. In some embodiments the Ubuntu® server may be distributed over a plurality of hardware servers using hypervisor technology.

The processor 2402 may be a multi-core server class processor suitable for hardware virtualization. The processor may support at least a 64-bit architecture and a single instruction multiple data (SIMD) instruction set. The main memory 2304 may include a combination of volatile memory (e.g. random access memory) and non-volatile memory (e.g. flash memory). The database 2406 may include one or more hard drives. The database 706 may also be configured to store parameters and profiles for the Welcome® system including the Welcome® server application 2202.

The datacenter network interface 2408 may provide one or more high-speed communication ports to data center switches, routers, and/or network storage appliances. The datacenter network interface 2408 may include high-speed optical Ethernet, InfiniBand (IB), Internet Small Computer System Interface (iSCSI), and/or Fibre Channel interfaces. The administration user interface 2410 may support local and/or remote configuration of the server 2204 and/or Welcome® server application 2202 by a datacenter administrator.

Figure 25:
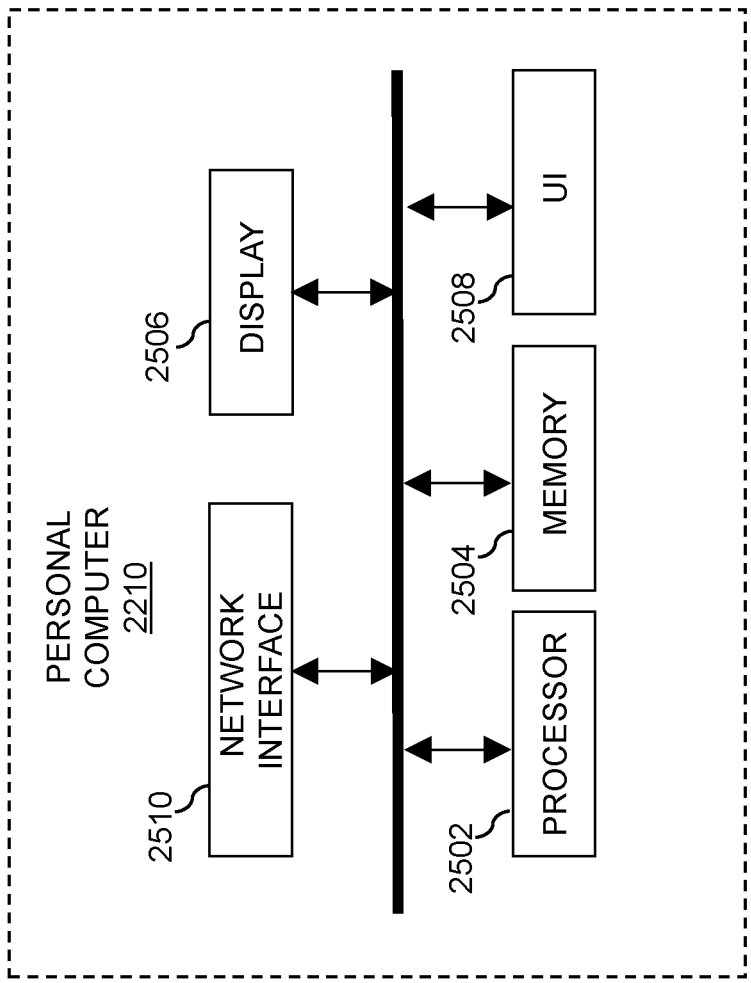
FIG. 25 depicts a block diagram illustrating a personal computer representative of a work station and/or a client device FIG. 22 and/or FIG. 23 in accordance with embodiments of the present disclosure.

FIG. 25 depicts a block diagram 2500 illustrating a personal computer 2210 representative of the work station 2210, the work station 2310, and/or a client devices 2214A-2214N of FIG. 22 and FIG. 23 in accordance with embodiments of the present disclosure. The personal computer may include at least one processor 2502, at least one memory 2504, at least one display 2506, a user interface 2508, and a network interface 2510. In certain embodiments, the personal computer 2210 may be a workstation class computing device. The processor 2502 may be an Intel core ai9-10900K desktop processor or the like. The memory 2504 may include a combination of volatile memory (e.g. random access memory) and non-volatile memory (e.g. flash memory). The memory 2504 may be partially integrated with the processor 2502. The user interface 2508 may include a keyboard. The user interface 2508 may also include a mouse, at touchpad, or the like. The user interface 2508 may also include a microphone, an amplifier, and speakers. In certain embodiments, the user interface 2508 may be integrated with the display 2506. The display 2506 may be a separate display or may be integrated with the other components (e.g. a laptop). In certain embodiments, at least a portion of display 2505 may include a 3-dimensional (3D) hologram projector. In still other embodiments, at least a portion of the display 2506 and the user interface 2508 may include a virtual reality (VR) user interface (e.g. a VR headset) or an augmented reality (AR) user interface (e.g. an AR headset).

The personal computer 2210 may include an operating system (OS) configured to run the Welcome® control room application 2213, the Welcome® control room application and server application 2312, and/or the Welcome® participant application 2216 as shown in FIG. 22 and FIG. 23. The operating system (OS) may be a Windows® OS, a Macintosh® OS, a Linux® OS, or the like. The network interface 2510 may be a wired Ethernet interface or a Wi-Fi interface. The personal computer 2210 may also be configured to access remote memory (e.g. network storage and/or cloud storage) via the network interface 910.

Figure 26:
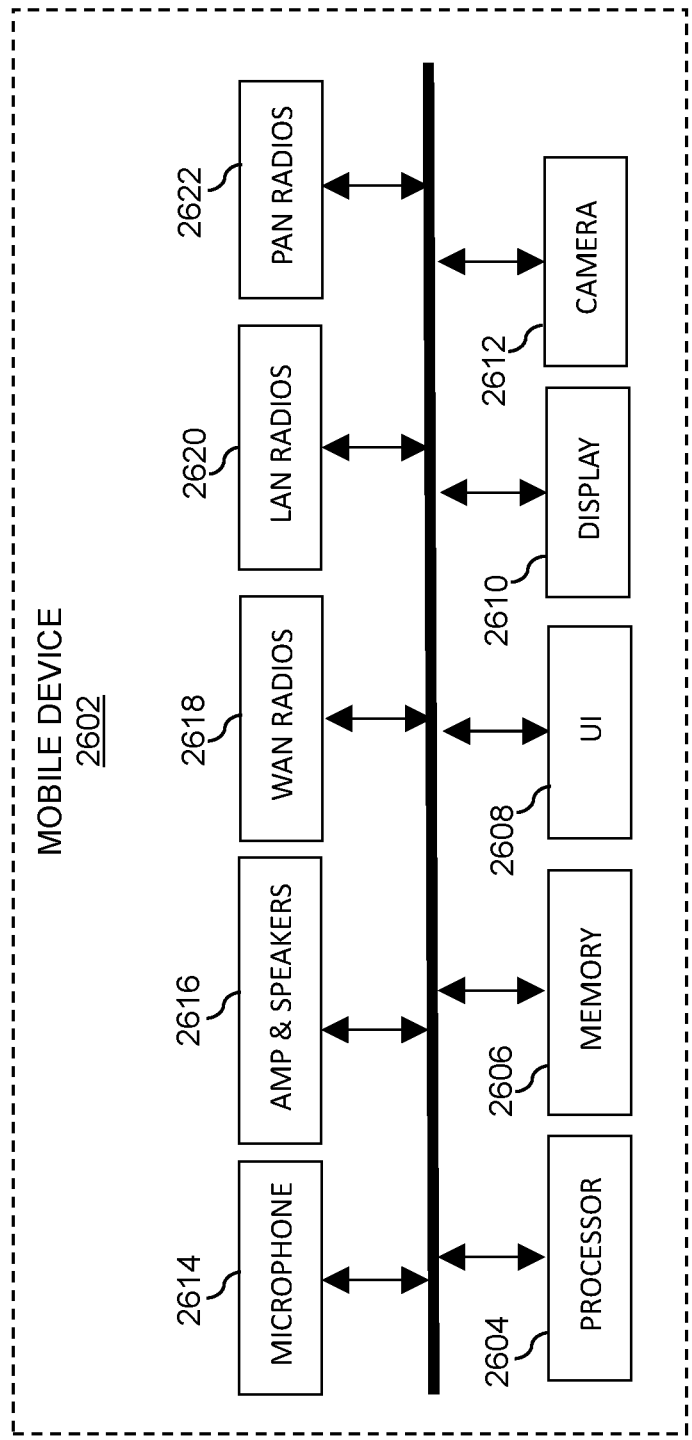
FIG. 26 depicts a block diagram illustrating a mobile device representative of the client device of FIG. 22 and/or FIG. 23 in accordance with embodiments of the present disclosure.

FIG. 26 depicts a block diagram 2600 illustrating a mobile device 2602 representative of any of the client devices 2214A-2214N of FIG. 22 and/or FIG. 23 in accordance with embodiments of the present disclosure. The mobile device 2602 may include at least one processor 2604, a memory 2606, a user interface 2608, a display 2610, a camera 2614, an amplifier and speakers 2616, wide area network (WAN) radios 2618, local area network (LAN) radios 2620, and personal area network (PAN) radios 2622. In some embodiments, the mobile device 2602 may be an iPhone® or an iPad®, using iOS® as an operating system (OS). In other embodiments, the mobile device 2602 may be an Android® OS device.

In some embodiments, the processor 2604 may be a mobile processor such as the Qualcomm® Snapdragon™ mobile processor. The memory 2606 may include a combination of volatile memory (e.g. random access memory) and non-volatile memory (e.g. flash memory). The memory 2606 may be partially integrated with the processor 2604. The user interface 2608 and the display 2610 may be integrated such as a touchpad display. The WAN radios 2618 may include 2G, 3G, 4G, and/or 5G technologies. The LAN radios 2620 may include Wi-Fi technologies such as 802.11a, 802.11b/g/n, 802.11ac, and/or 802.11ax circuitry. The PAN radios 2622 may include Bluetooth® technologies. The mobile device 2602 may be configured to communicate over the network 2208 of FIG. 22 and/or FIG. 23 using one or more of the WAN radios 2618 and/or the LAN radios 2620.

Figure 27:
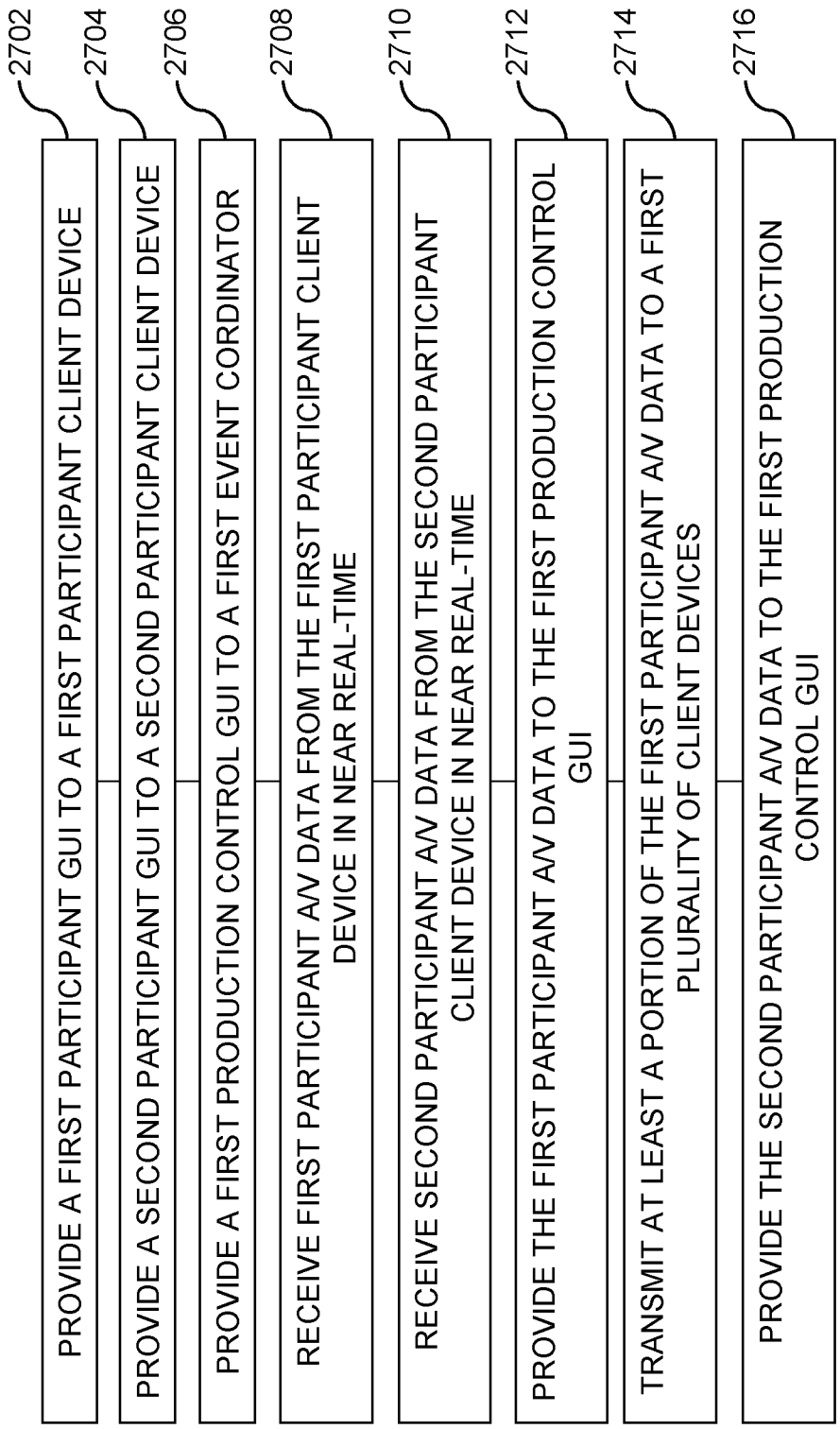
FIG. 27 depicts a flow chart illustrating a method for providing an interactive virtual event in accordance with embodiments of the present disclosure.

FIG. 27 depicts a flow chart 2700 illustrating a computer-implemented method for providing an interactive virtual event in accordance with embodiments of the present disclosure.

In step 2702, the computer implemented method provides a first participant GUI to a first participant client device of the interactive virtual event.

In step 2704, the computer implemented method provides a second participant GUI to a second participant client device of the interactive virtual event In step 2706, the computer implemented method provides a first production control GUI to a first event coordinator.

In step 2708, the computer implemented method receives first participant A/V data from the first participant client device in near real-time.

In step 2710, the computer implemented method receives second participant A/V data from the second participant client device in near real-time.

In step 2712, the computer implemented method provides the first participant A/V data to the first production control GUI In step 2714, the computer implemented method transmits at least a portion of the first participant A/V data to a plurality of participant client devices associated with the plurality of participants.

In step 2716, the computer implemented method provides the second participant A/V data to the first production control GUI.

Figure 28:
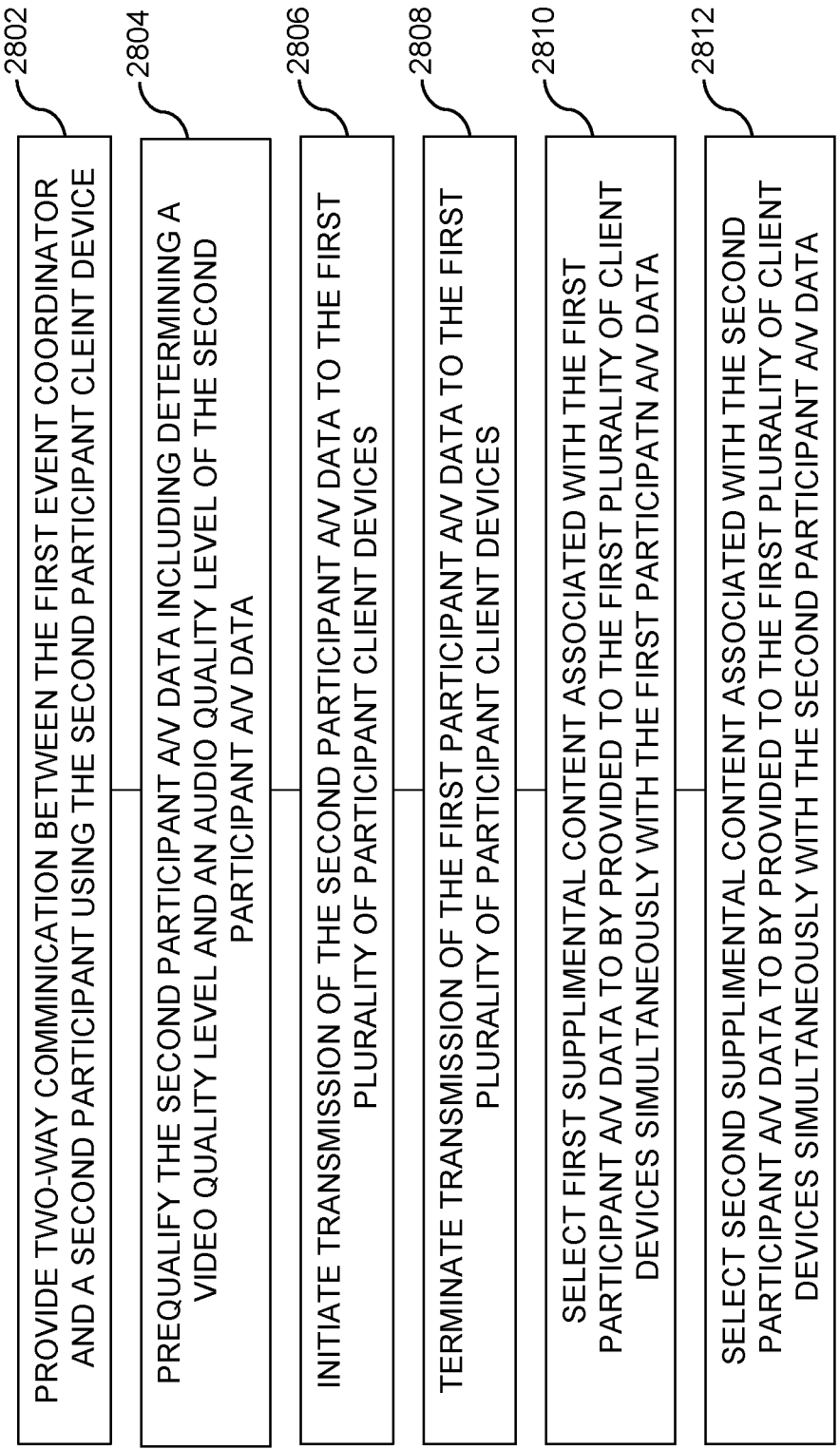
FIG. 28 depicts another flow chart illustrating a method for providing an interactive virtual event in accordance with embodiments of the present disclosure.

FIG. 28 depicts another flow chart 2800 further illustrating the computer implemented method of flow chart 2700 for providing an interactive virtual event in accordance with embodiments of the present disclosure.

In step 2802, the computer implemented method provides two-way communication between the first event coordinator and a second participant using the second participant client device.

In step 2804, the computer implemented method prequalifies the second participant A/V data including determining a video quality level and an audio quality level of the second participant A/V data.

In step 2806, the computer implemented method initiates transmission of the second participant A/V data to the first plurality of participant client devices.

In step 2808, the computer implemented method terminates transmission of the first participant A/V data to the first plurality of participant client devices In step 2810, the computer implemented method selects first supplemental content associated with the first participant A/V data to be provided to the first plurality of participant client devices simultaneously with the first participant A/V data In step 2812, the computer implemented method selects second supplemental content associated with the second participant A/V data to be provided to the first plurality of participant client devices simultaneously with the second participant A/V data As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C #, Objective-C, Go, Scala, Swift, Kotlin, OCaml, AngularJS, or the like. The program code may execute entirely on the user's computer, partly on the user's computer, as a stand-alone software package, partly on the user's computer, and partly on a remote computer or entirely on the remote computer or server.

Aspects of the present invention are described in the instant specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a user" can include a plurality of such users, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing an interactive virtual event to a plurality of participants, the computer-implemented method comprising:
    providing a first participant graphical user interface (GUI) to a first participant client device of the interactive virtual event;
    providing a second participant GUI to a second participant client device of the interactive virtual event;
    providing a first production control GUI to a first event coordinator;
    receiving first participant audio/video (A/V) data from the first participant client device in near real-time;
    receiving second participant A/V data from the second participant client device in near real-time;
    providing the first participant A/V data to the first production control GUI;
    transmitting the first participant A/V data to a first plurality of participant client devices associated with the plurality of participants, wherein the first plurality of participant client devices have selected a virtual lounge selection;
    providing the second participant A/V data to the first production control GUI;
    providing a participant virtual lounge GUI to each participant client device of the first plurality of participant client devices, wherein the participant virtual lounge GUI is configured to simultaneously provide a main virtual event selection and a virtual photo booth selection; and
    upon receiving the virtual photo booth selection from a first client device of the first plurality of participant client devices, providing each participant client device of the first plurality of participant client devices a photo booth GUI, wherein the photo booth GUI includes:
        a selection button that, when selected by a user, selects one of a plurality of backgrounds for a group photo; and
        a camera button that, when selected by a user, captures the group photo wherein the captured group photo includes the selected one of the plurality of backgrounds and images of users of at least two of the first plurality of participant client devices.

2. The computer-implemented method of claim 1 further comprising transmitting at least a portion of the first participant A/V data to the first plurality of participant client devices, wherein the first production control GUI is configured to facilitate the first event coordinator in:

providing two-way communication between the first event coordinator and a second participant using the second participant client device;

prequalifying the second participant A/V data including determining a video quality level and an audio quality level of the second participant A/V data;

initiating transmission of the second participant A/V data to the first plurality of participant client devices; and terminating transmission of the first participant A/V data to the first plurality of participant client devices.

3. The computer-implemented method of claim 2, wherein the first production control GUI is further configured to facilitate the first event coordinator in:

selecting first supplemental content associated with the first participant A/V data to be provided to the first plurality of participant client devices simultaneously with the first participant A/V data; and selecting second supplemental content associated with the second participant A/V data to be provided to the first plurality of participant client devices simultaneously with the second participant A/V data.

4. The computer-implemented method of claim 3, wherein:

the first supplemental content is at least one of an overlay, a slideshow, and a prerecorded video; and the second supplemental content is at least one of an overlay, a slideshow, and a prerecorded video.

5. The computer-implemented method of claim 3, wherein:

the first supplemental content is selected from a first supplemental content list associated with the first participant A/V data and the first supplemental content list is displayed on the first production control GUI; and the second supplemental content is selected from a second supplemental content list associated with the second participant A/V data and the second supplemental content list is displayed on the first production control GUI.

6. The computer-implemented method of claim 3 further comprising providing a second production control GUI and the second production control GUI is configured to facilitate a second event coordinator in:

providing two-way communication between the second event coordinator and the second participant using the second participant client device;

prequalifying the second participant A/V data including determining the video quality level and the audio quality level of the second participant A/V data;

initiating transmission of the second participant A/V data to the first plurality of participant client devices;

terminating transmission of the first participant A/V data to the first plurality of participant client devices;

selecting the first supplemental content associated with the first participant A/V data to be provided to the first plurality of participant client devices simultaneously with the first participant A/V data; and selecting the second supplemental content associated with the second participant A/V data to be provided to the first plurality of participant client devices simultaneously with the first participant A/V data.

7. The computer-implemented method of claim 1, wherein the interactive virtual event is at least one of a corporate event, a private event, and a charity event.

8. The computer-implemented method of claim 1, wherein the interactive virtual event is at least one of a corporate conference, an industry trade show, a seminar, and a product launch.

9. The computer-implemented method of claim 1, wherein the participant virtual lounge GUI is further configured to provide a donation webpage selection.

10. The computer-implemented method of claim 9, wherein the main virtual event selection configures the participant virtual lounge GUI to display a primary A/V stream for the interactive virtual event.

11. The computer-implemented method of claim 10, wherein the donation webpage selection configures the participant virtual lounge GUI to display:

a primary window having a plurality of donation selections for making a contribution related to the interactive virtual event;

a secondary window displaying the primary A/V stream; and a secondary window for chat.

12. The computer-implemented method of claim 11, wherein the plurality of donation selections includes at least two of:

a one-time donation;

a recurring donation; and a preselection amount.

13. The computer-implemented method of claim 10, wherein the virtual lounge selection configures the participant virtual lounge GUI for selecting a plurality of virtual lounge options including a plurality of virtual meeting room selections.

14. The computer-implemented method of claim 13, wherein each room selection of the plurality of virtual meeting room selections is labeled to be specific to an associated unique topic.

15. The computer-implemented method of claim 14, wherein the unique topic associated with each room selection of the plurality of room selections is related to a theme of the interactive virtual event.

16. The computer-implemented method of claim 13, wherein the virtual lounge selection further configures the participant virtual lounge GUI for A/V communication with one or more participants of the plurality of participants having previously selected one of the virtual lounge options.

17. A server for providing for providing an interactive virtual event to a plurality of participants, the server comprising:

a memory; and at least one processor configured for:

providing a first participant graphical user interface (GUI) to a first participant client device of the interactive virtual event;

providing a second participant GUI to a second participant client device of the interactive virtual event;

providing a first production control GUI to a first event coordinator;

receiving first participant audio/video (A/V) data from the first participant client device in near real-time;

receiving second participant A/V data from the second participant client device in near real-time;

providing the first participant A/V data to the first production control GUI;

transmitting at least a portion of the first participant A/V data to a first plurality of participant client devices, wherein the first plurality of participant client devices have selected a virtual lounge selection;

providing the second participant A/V data to the first production control GUI;

providing a participant virtual lounge GUI to each participant client device of the first plurality of participant client devices, wherein the participant virtual lounge GUI is configured to simultaneously provide a main virtual event selection and a virtual photo booth selection; and upon receiving the virtual photo booth selection from a first client device of the first plurality of participant client devices, providing each participant client device of the first plurality of participant client devices a photo booth GUI, wherein the photo booth GUI includes:
  a selection button that, when selected by a user, selects one of a plurality of backgrounds for a group photo; and
  a camera button that, when selected by a user, captures the group photo wherein the captured group photo includes the selected one of the plurality of backgrounds and images of users of at least two of the first plurality of participant client devices.

18. A non-transitory computer readable medium comprising a plurality of machine-readable instructions which when executed by one or more processors of a server are adapted to cause the server to perform a method of providing an interactive virtual event to a plurality of participants, the method comprising:
  providing a first participant graphical user interface (GUI) to a first participant client device of the interactive virtual event;
  providing a second participant GUI to a second participant client device of the interactive virtual event;
  providing a first production control GUI to a first event coordinator;
  receiving first participant audio/video (A/V) data from the first participant client device in near real-time;
  receiving second participant A/V data from the second participant client device in near real-time;
  providing the first participant A/V data to the first production control GUI;
  transmitting at least a portion of the first participant A/V data to a first plurality of participant client devices, wherein the first plurality of participant client devices have selected a virtual lounge selection;
  providing the second participant A/V data to the first production control GUI;
  providing a participant virtual lounge GUI to each participant client device of the first plurality of participant client devices, wherein the participant virtual lounge GUI is configured to simultaneously provide a main virtual event selection and a virtual photo booth selection; and
  upon receiving the virtual photo booth selection from a first client device of the first plurality of participant client devices, providing each participant client device of the first plurality of participant client devices a photo booth GUI, wherein the photo booth GUI includes:
    a selection button that, when selected by a user, selects one of a plurality of backgrounds for a group photo; and
    a camera button that, when selected by a user, captures the group photo wherein the captured group photo includes the selected one of the plurality of backgrounds and images of users of at least two of the first plurality of participant client devices.

* * * * *